United States Patent [19]

Mannik

[11] Patent Number: 5,397,881

[45] Date of Patent: Mar. 14, 1995

[54] THIRD MILLENIUM CREDIT CARD WITH MAGNETICALLY ONTO IT WRITTEN MULTIPLE VALIDITY DATES, FROM WHICH IS ONE SINGLE DAY AS THE CREDIT CARD'S VALIDITY DAY SELECTED DAY AFTER DAY BY THE LEGITIMATE CARD OWNER

[76] Inventor: Kallis H. Mannik, P.O. Box 43, Webster, N.Y. 14580

[21] Appl. No.: 155,210

[22] Filed: Nov. 22, 1993

[51] Int. Cl.$^6$ .................................... G06K 19/00
[52] U.S. Cl. .................................... 235;380; 235/486
[58] Field of Search ................ 235/380, 486, 493; 283/904

[56] References Cited

FOREIGN PATENT DOCUMENTS

| 105381 | 6/1983 | Japan | 235/380 |
|---|---|---|---|
| 196289 | 8/1991 | Japan | 235/380 |
| 01091 | 2/1988 | WIPO | 235/486 |
| 13096 | 11/1990 | WIPO | 235/380 |

Primary Examiner—John Shepperd

[57] ABSTRACT

The Third Millenium credit card according to the present invention has magnetically into it written instead of only one expiration date, multiple expiration dates and multiple shopping hour periods, which are selected daily by means of erasing magnetic marking for one of these dates and by means of erasing magnetic marking for one of the shopping periods by the legitimate card user. The erased magnetic markings are rewritten into the credit card in any point of sales scanning device during the regular shopping procedure. These rewritten markings are again erased selectively day by day by the legitime card user, during the next time cycle of the credit card (week, 2 weeks or a month) according to this invention, as shown in FIG. 16. Thus the credit card according to this invention is continuously rejuvenated. The selective erasing of magnetic markings is done by the card user by means of a business card case like device which has a movable magnet built into it for erasing one date-mark each day. The erasure is completed by closing this card case for only two seconds.

20 Claims, 20 Drawing Sheets

SECTION A-A

"TRANSACTION APPROVED"
SIGNAL TO POINT-OF-SALES SCANNER

"TRANSACTION APPROVED"
SIGNAL TO SCANNER

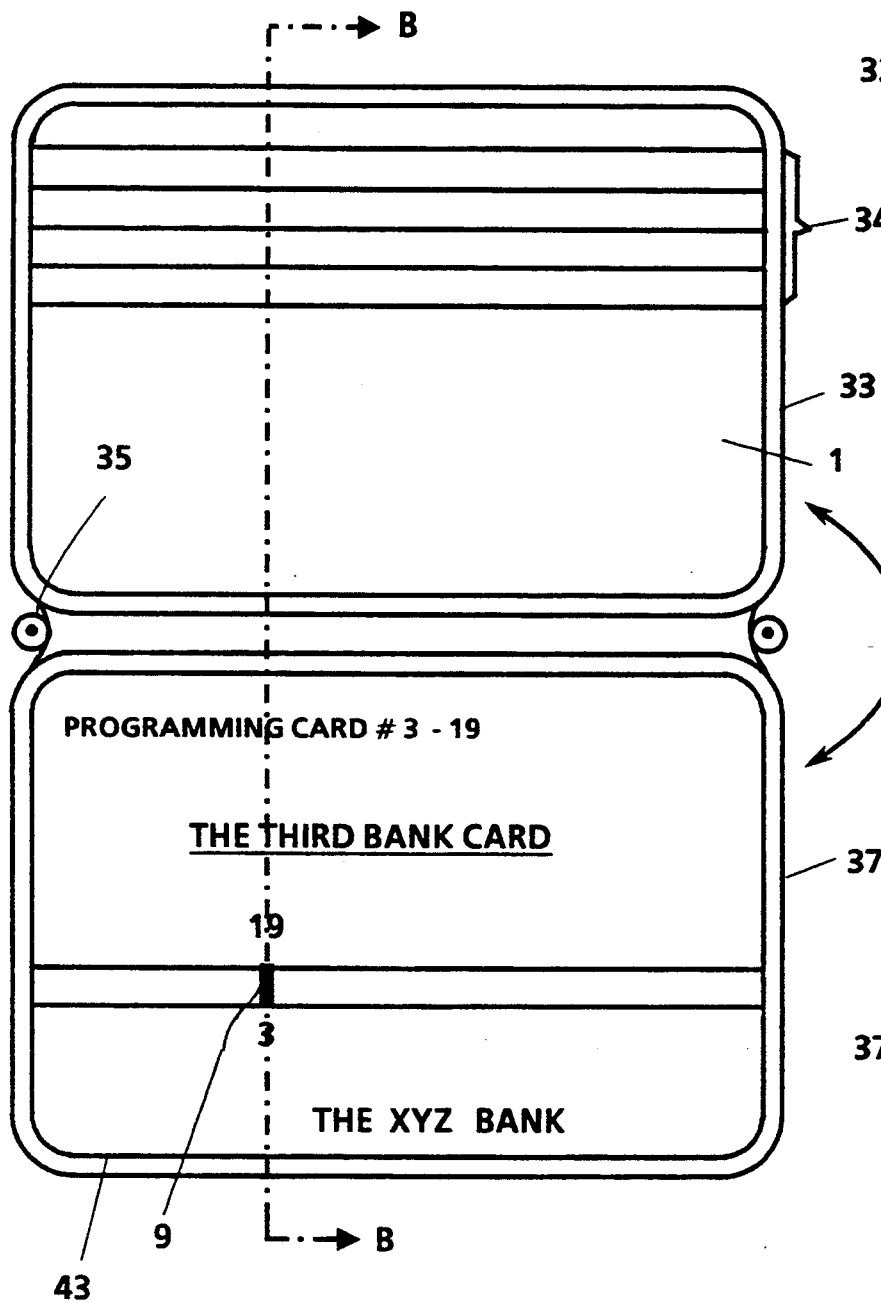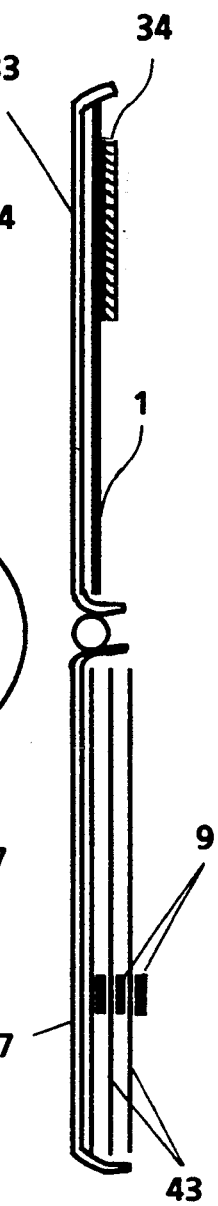
FIG. 11
FIG. 12

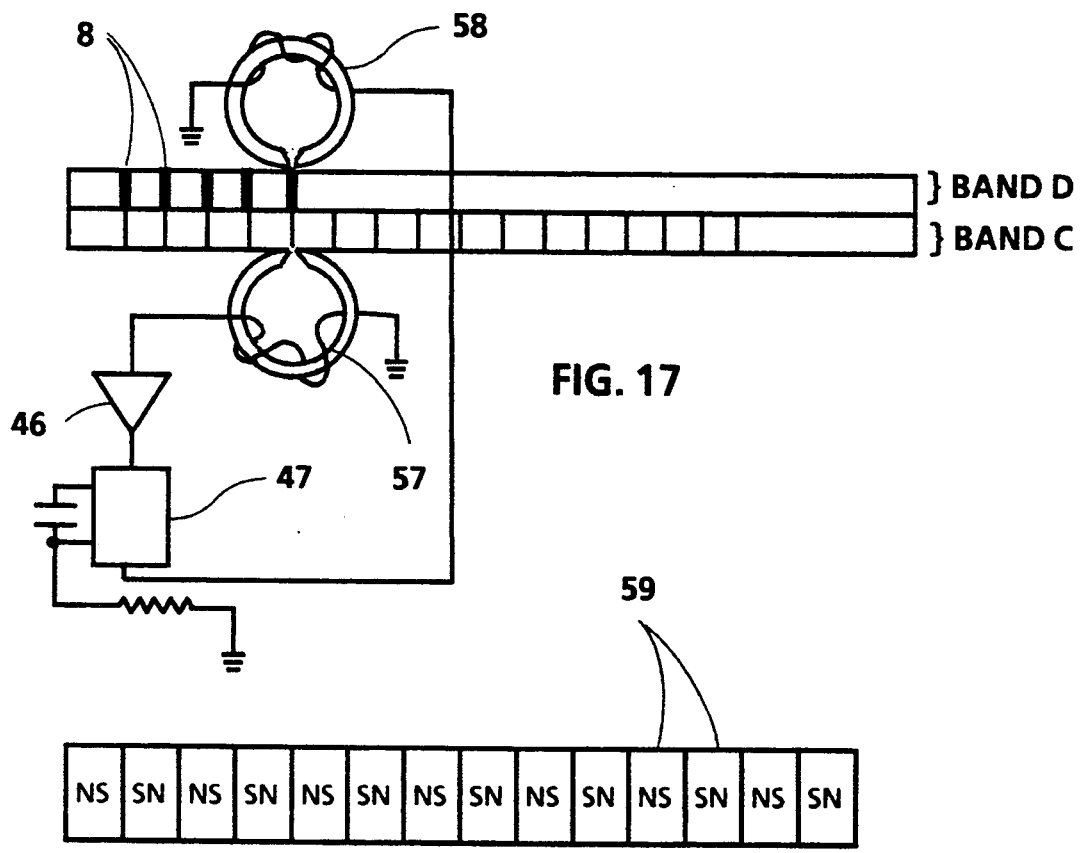
FIG. 17
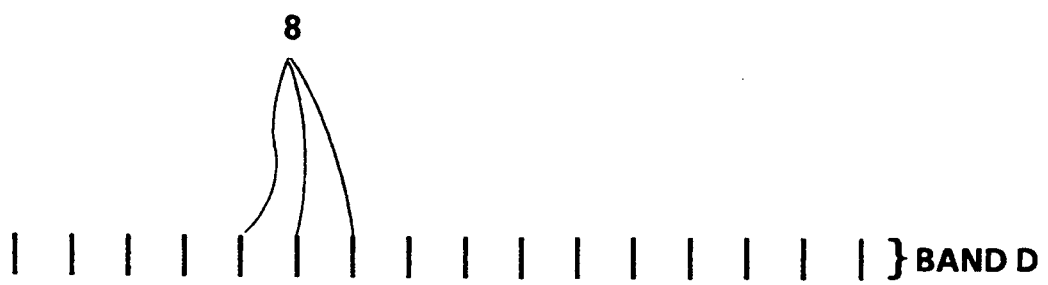
FIG. 18
FIG. 19

THIRD MILLENIUM CREDIT CARD WITH MAGNETICALLY ONTO IT WRITTEN MULTIPLE VALIDITY DATES, FROM WHICH IS ONE SINGLE DAY AS THE CREDIT CARD'S VALIDITY DAY SELECTED DAY AFTER DAY BY THE LEGITIMATE CARD OWNER

BACKGROUND OF THE INVENTION.

Credit cards and charge cards are becoming more and more accepted all over the world.

Typical credit cards have a set expiration date, usually one to two years from the date of the issue. Larger banks extend the expiration date as far as possible, to avoid extensive reissuing of new cards. Use of this technique reduces both the cost of new cards and the postage involved in their mailing. The main drawback to the extended expiration date of a typical major credit card becomes apparent, when the card is stolen. The unauthorized user may use the card until the expiration date is reached at stores that fail to check the stolen or lost credit card list carefully. When a credit card falls in unauthorized hands, purchases made during the time until the expiration date, can cause considerable financial losses to the issuing bank.

In order to reduce the risk of financial losses to credit card companies it would be advantageous to these companies to have expiration dates for credit cards made much shorter, as close as possible to the date of the possible theft.

According to the current invention the expiration dates of The Third Millennium credit cards will be reduced from a typical year or two duration to one single day, to 24 hours or less.

In case the losses which financial institutions are currently experiencing, are reduced drastically, the interest rates on credit cards and annual fees could be reduced also drastically and The Third Millennium cards according to the current invention: credit cards, charge cards, debit cards, health care cards etc. could really be the wave of the future, the only kind of cards which will be used during the next century and beyond.

The money will slowly be reduced to a numismatic rarity, which only very few people will be using in the future.

BRIEF SUMMARY OF THE INVENTION

Credit card according to the present invention has in its magnetic band recorded multiple expiration dates and multiple expiration hours.

From these multiple expiration dates/hours, every day the current date's magnetic mark as an expiration date will be erased by means of a tiny permanent magnet or some other electromagnetic eraser, thus making this day the shopping day. In the same time the magnetic markings for selected shopping hours will be erased in the same way.

When some unauthorized person will get hold of this credit card, and he or she tries to use it during the next hour or two, he or she can be stopped by the point-of-sales sales-person, because the card scanner probably reads that this next hour shopping time is not valid for this card's useage, this card has expired.

In case a thief has got in his possession this kind of variable expiration date/time credit card, he or she can use it only until midnight that day during a very short time.

In case he presents this card to a store a short time after he has stolen it, he will experience a bad surprise, because it is possible, that this card has magnetically reached already its expiration hour, but the thief still believes, that he or she has a valid card, because on the card is still printed the original, for him or for her now worthless, expiration date. But he or she has no way to know that, because the expiration date and expiration hour markings on the magnetic surface of the credit card are invisible.

During a travel it is very easy to loose a credit card, also during Holiday shopping periods, like during Christmas season. By having the Third Millenium credit card with him or with her all the time a credit card owner has the peace of mind, because he or she and his bank or her bank are guaranteed that losses will not occur after an hour or two after the theft or loss of the credit card.

This reduced risk for financial institutions can very easily be translated to considerably lower interest rates and lower yearly fees for this kind of credit cards with built in safety feature against financial losses.

The performance of this adjustable date credit card doesn't change with time.

BRIEF DESCRIPTION OF DRAWINGS

FIG. 11 is a view, showing a credit card case, which is used for changing the expiration date of the credit card. The credit card, according to this invention, will be laid down into this case. Onto the lid-side of this case there is a package of 16 cards, with a tiny magnet on each of them, which will selectively change the expiration date, depending on which date-card it is used.

FIG. 12 is a cross-sectional view of this credit card expiration date changing card case, taken along the line B—B of FIG. 11.

FIG. 17 is a view showing a credit card rejuvenating device, made of a simple scanner with a read-head for reading the timing marks from the band C and a write-head for writing magnetic marks onto the band D.

FIG. 18 is a view of a static magnetizing unit, made up of a number of permanent magnets, packaged so, that the magnet poles of these magnets of the same polarity are facing each other, in such a way, that these magnets will be repelling each other.

FIG. 19 is a view showing the magnetic marks on a credit card according to the current invention, which were made by means of the magnetizing unit, shown in FIG. 18.

Figure 21:
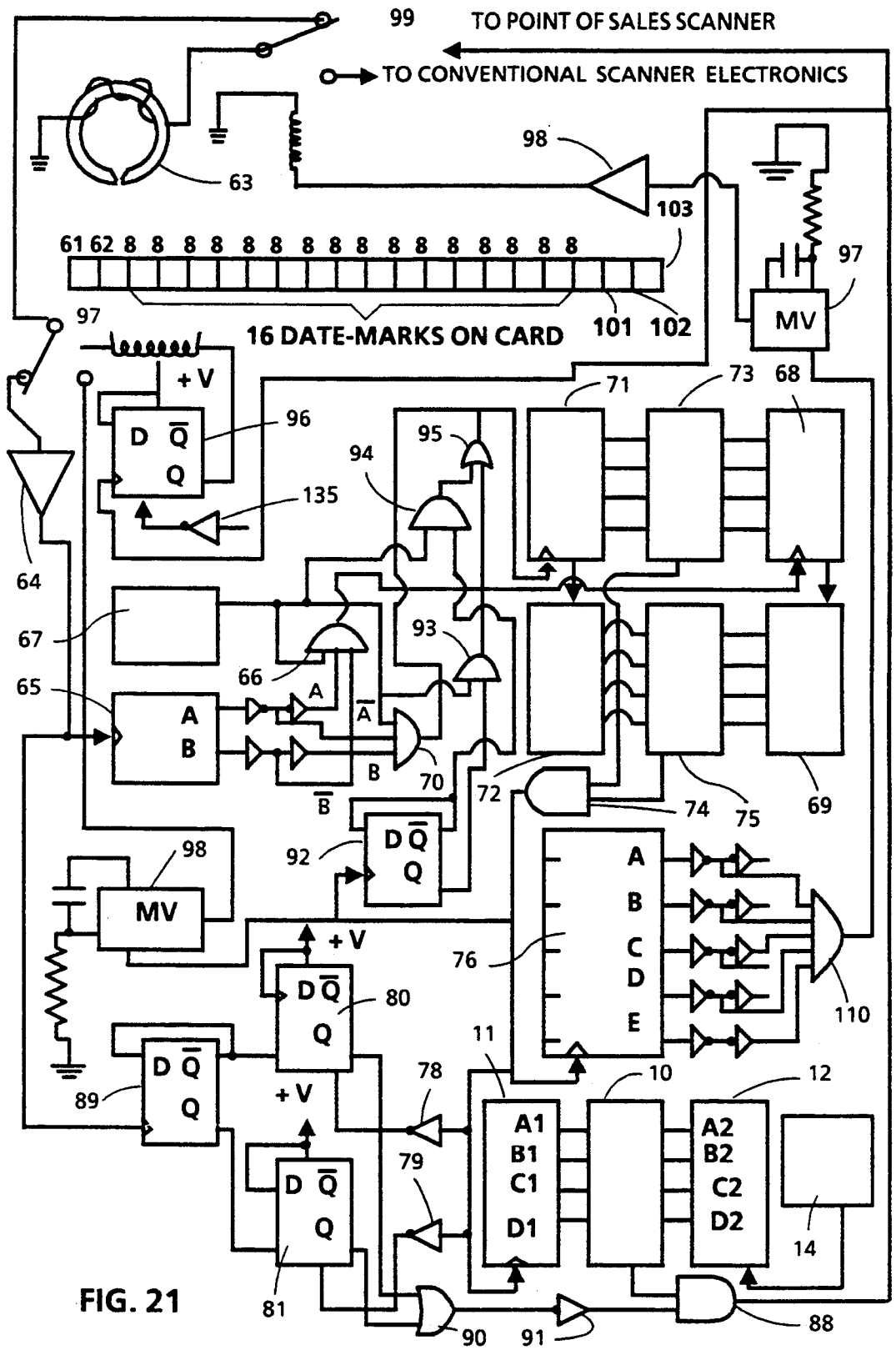
FIG. 21 is showing the electronic circuitry in central processing area, which is needed, when only two currently used bands (band A and band B) are used for The Third Millenium credit cards according to the present invention.

On this drawing are also shown 2 magnetic markings, 101 and 102, FIG. 21, which are used for specifying selected shopping periods for the day and one magnetic marking for eventual cancelling of these shopping periods.

Figure 22:
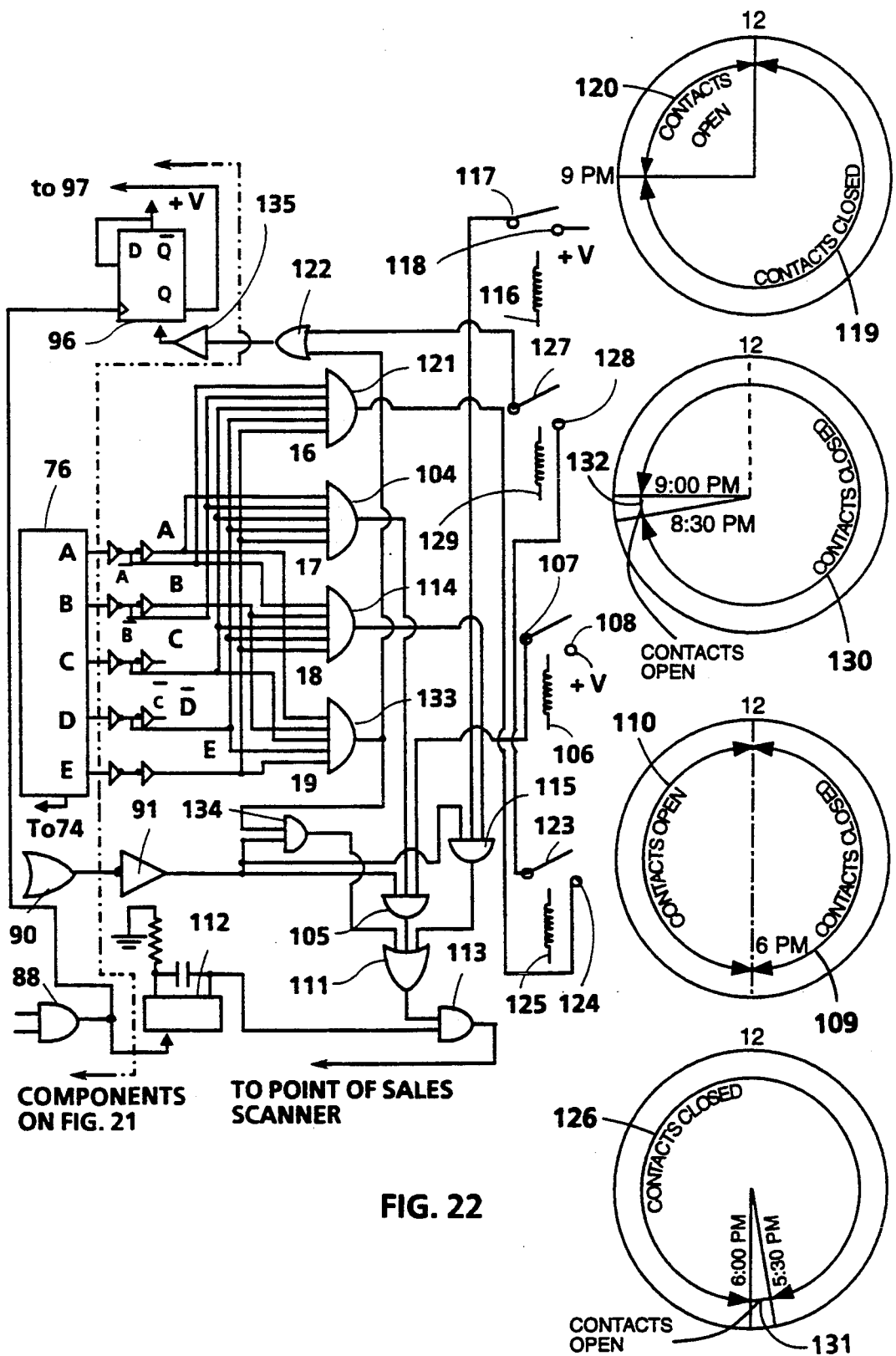

FIG. 22 is showing the electronic circuitry, which is used for generating certain selected shopping periods for the credit card user, typically from early morning hours to 6:00 PM and from early morning hours to 9:00 PM.

On this drawing are also shown schematically the times of the T Time/Date-Verifying-Clock, during which times the Clock's four timer-relay's contacts are closed or open.

Figure 23:
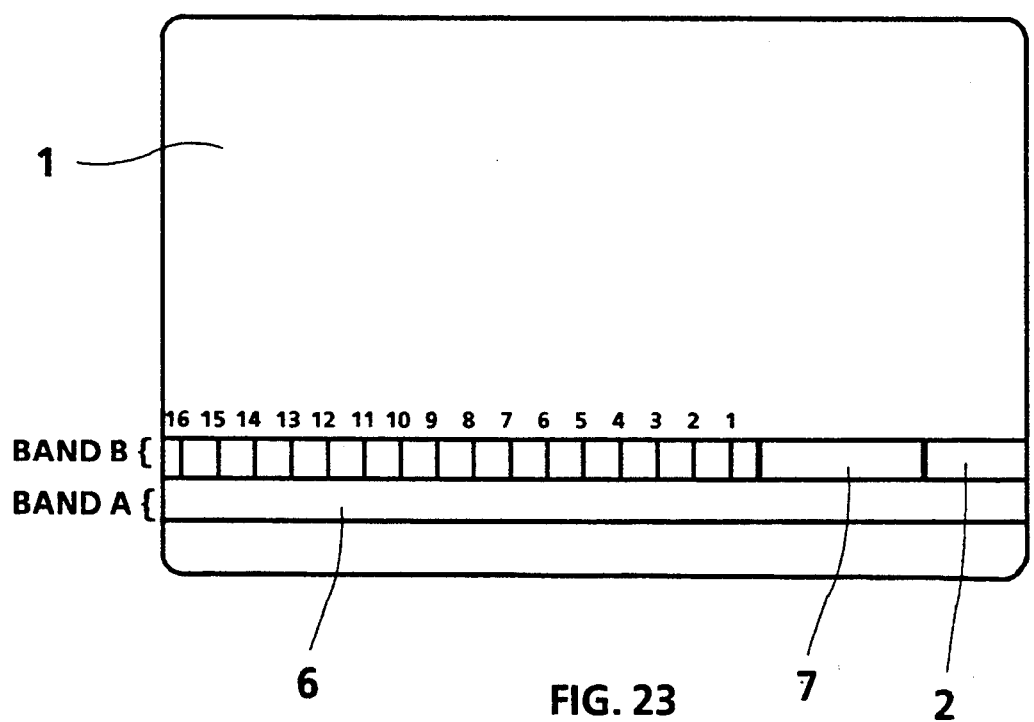

FIG. 23 is showing a credit card, where on the leading edge of the band B are magnetically recorded 16 changeable expiration dates, where the number of on the card remaining magnetic markings defines, which date it is currently.

For ex,
- 16 magnetic marks on the card tells, that it is the 1st of the month
- 15 magnetic marks on the card tells, that it is the 2nd of the month
- 14 magnetic marks on the card tells, that it is the 3rd of the month
- 2 magnetic marks on the card tells, that it is the 15th of the month
- 1 magnetic mark on the card tells, that it is the 16th of the month.

Thereafter the magnetic marks have to be rewritten, the card has to be rejuvenated in ways, described earlier in connection of other embodiments of the current invention.

Figure 24:
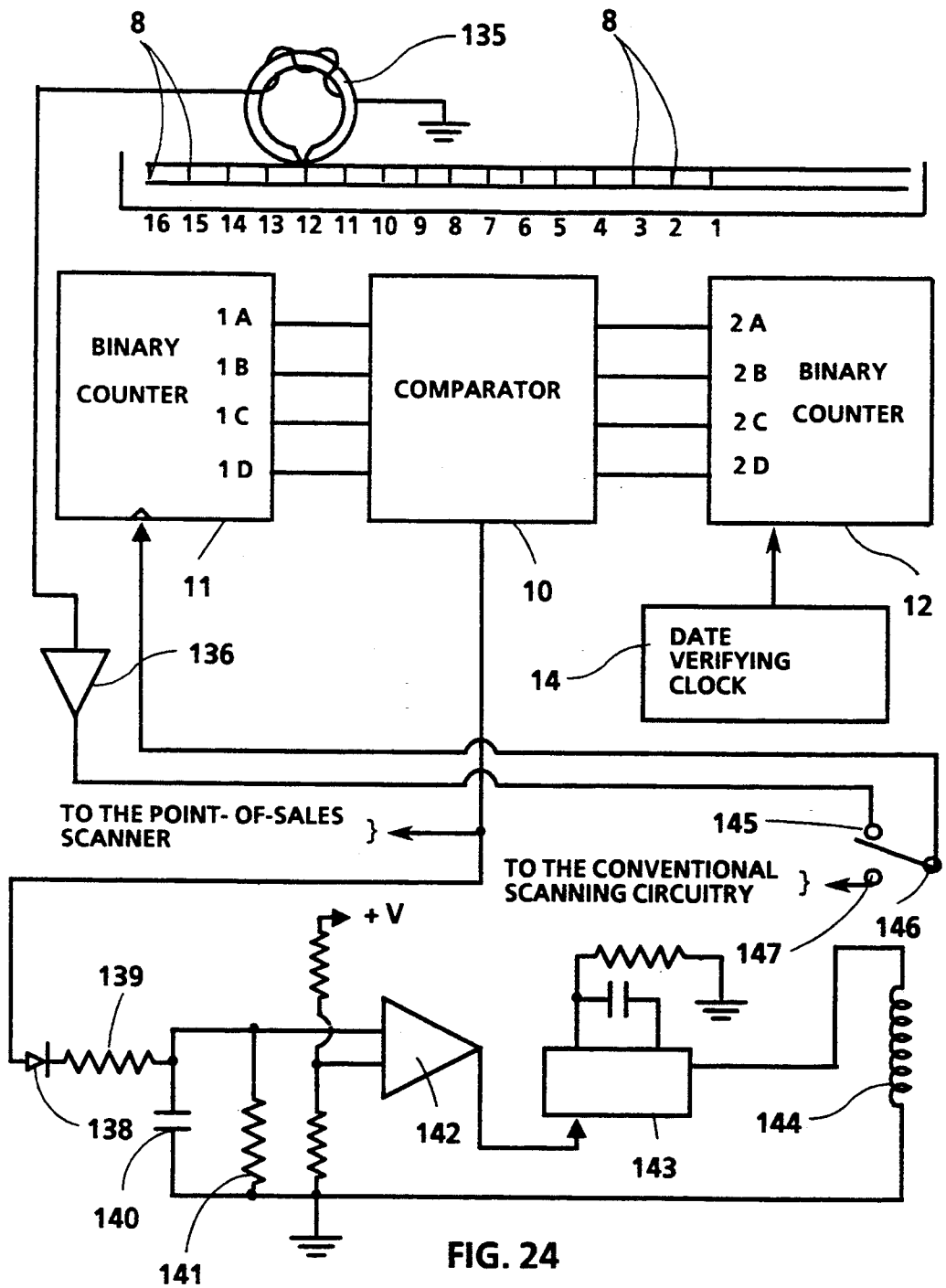

FIG. 24 is showing the necessary electronic circuitry in central processing area which is needed, when only the two currently used bands, band A and band B are used for the Third Millennium Credit card according to one embodiment of the present invention, where by means of a read-head pulse counting of the on the card remaining magnetic marks, the credit card's validity date is defined.

DETAILED DESCRIPTION

Typical major credit cards have a certain expiration date, usually one to two years from the date when the card was issued. Large banks keep this expiration date for their major credit cards as far as possible from the date of issuance in order to change cards less frequently. In this way banks will cut down the cost for new cards and postage for mailing these cards. The drawback for a year or two duration of a typical major credit card is that in case this card is lost or fallen into hands of an unauthorized person (thiefs, robbers, burglars), he or she can use this card during the same 1-2 years duration time at stores, which are not checking keenly, whether a card is on stolen or lost credit cards list. When a credit card falls into unauthorized hands, purchases made during the time until the expiration date, are causing big financial losses to the issuing financial institution.

In order to reduce risk of financial losses to credit card companies, it would be advantageous for credit card companies to have the expiration dates for their credit cards as close as possible to a possible day of theft.

According to the present invention the expiration dates of The Third Millennium credit cards will be reduced from a typical year or two duration to one single day, or in some cases just to a few hours.

Reducing drastically by means of these single day expiration date credit cards the losses, which financial institutions are currently experiencing, the interest rates on credit cards and the annual fee for credit cards could be also considerably reduced and The Third Millennium cards according to the present invention: credit cards, charge cards, debit cards, health care cards etc. could really be the wave of the future, the only kind of cards, which will be used during the next century. The money could be slowly reduced to a numismatic rarity, which only a very few people will be using in the future.

Figure 1:
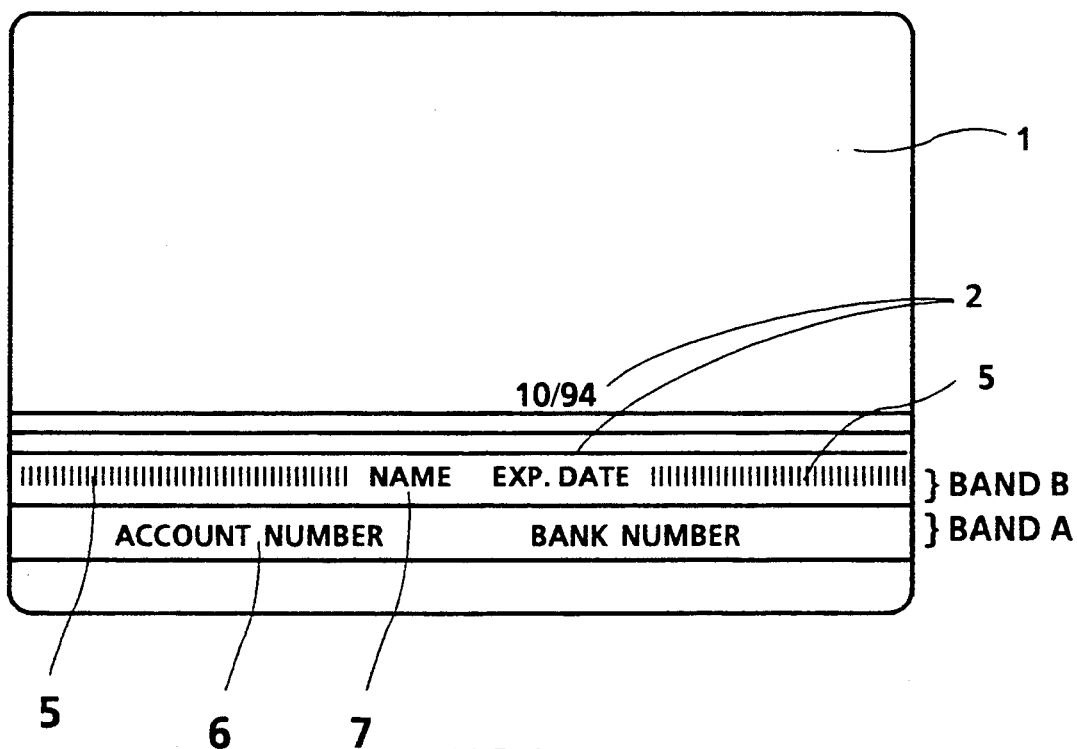
FIG. 1 is a view, showing a conventional credit card, with magnetic surface on which it is magnetically written the card owners name, his or her account number, his or her bank's number and the expiration date of the credit card.

On present credit cards, the expiration date 2, FIG. 1, is magnetically imprinted by means of a bar code or some other code, as a certain month and a year (Example: 10/94, as shown in FIG. 1). On the present credit cards it is written in bar code also the credit card owners account number and the bank number 6, FIG. 1 and the card owners name 7, FIG. 1.

Figure 2:
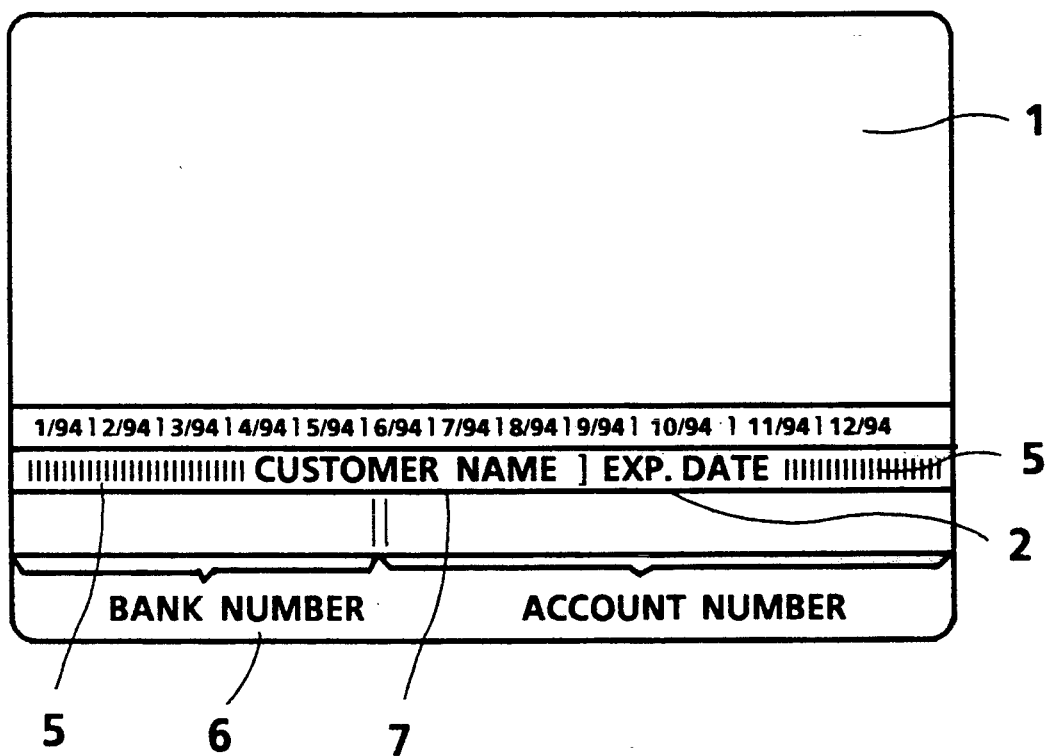
FIG. 2 is a view showing a modified credit card according to the present invention, where on band C it is in bar code recorded 12 months of the year, as changeable expiration dates.
Figure 3:
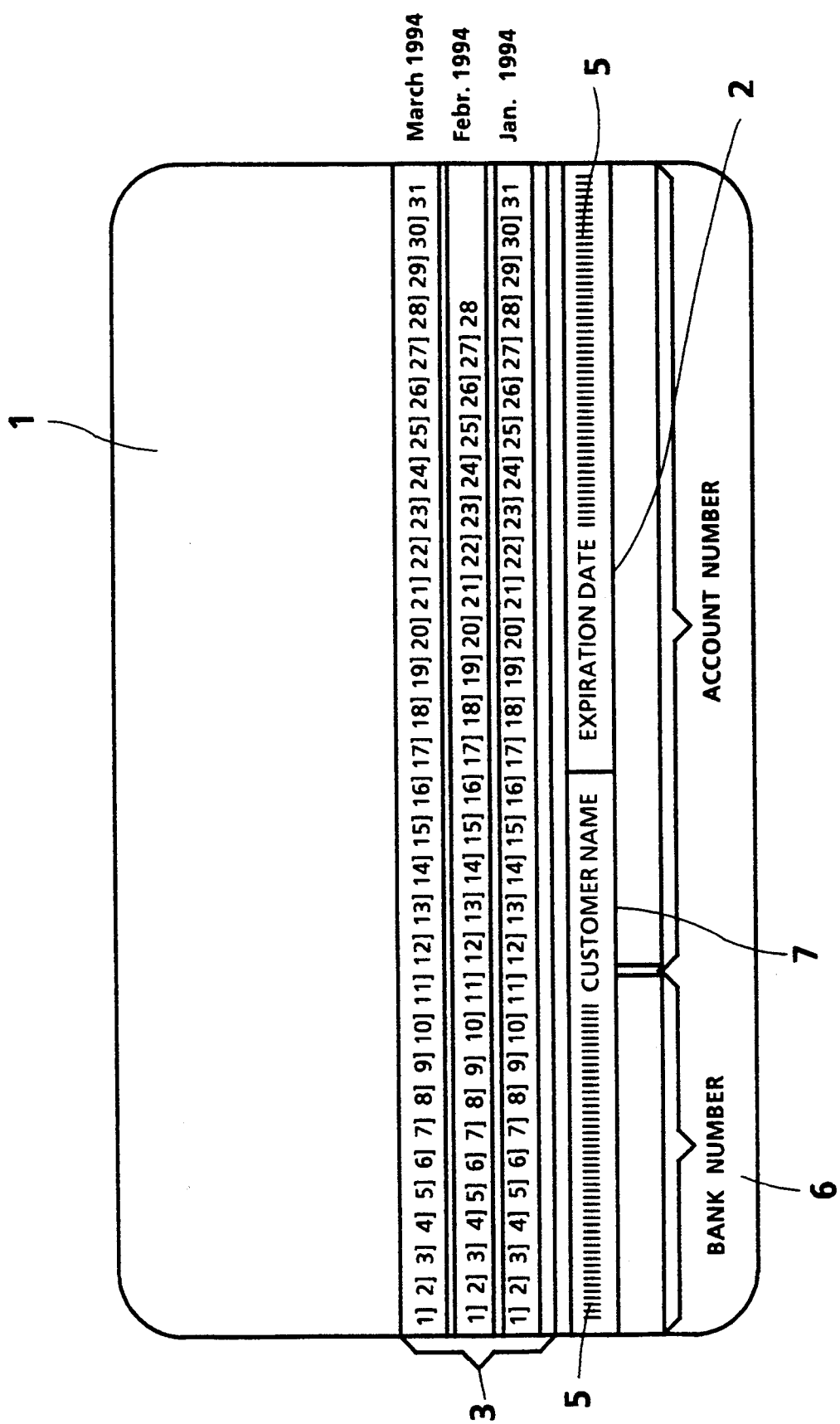
FIG. 3 is a view showing a credit card where on magnetic bands C, D and E are magnetically written dates of three consecutive months of a year.
Figure 4:
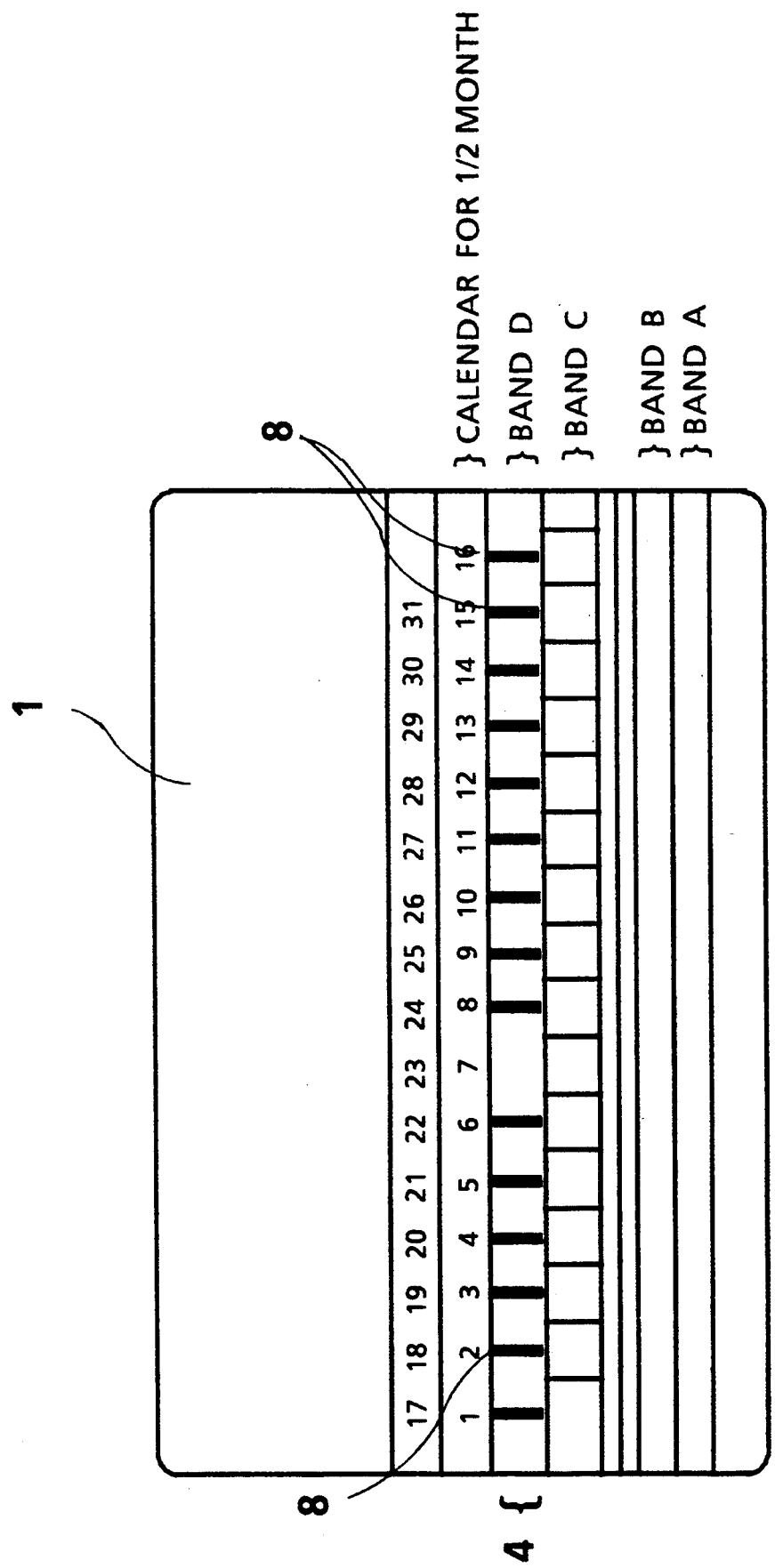
FIG. 4 is a view showing a credit card according to the present invention, where on the band C are magnetically written 16 timing marks, and where on the band D are magnetically written 16 expiration dates for a half of a month time period.
Figure 5:
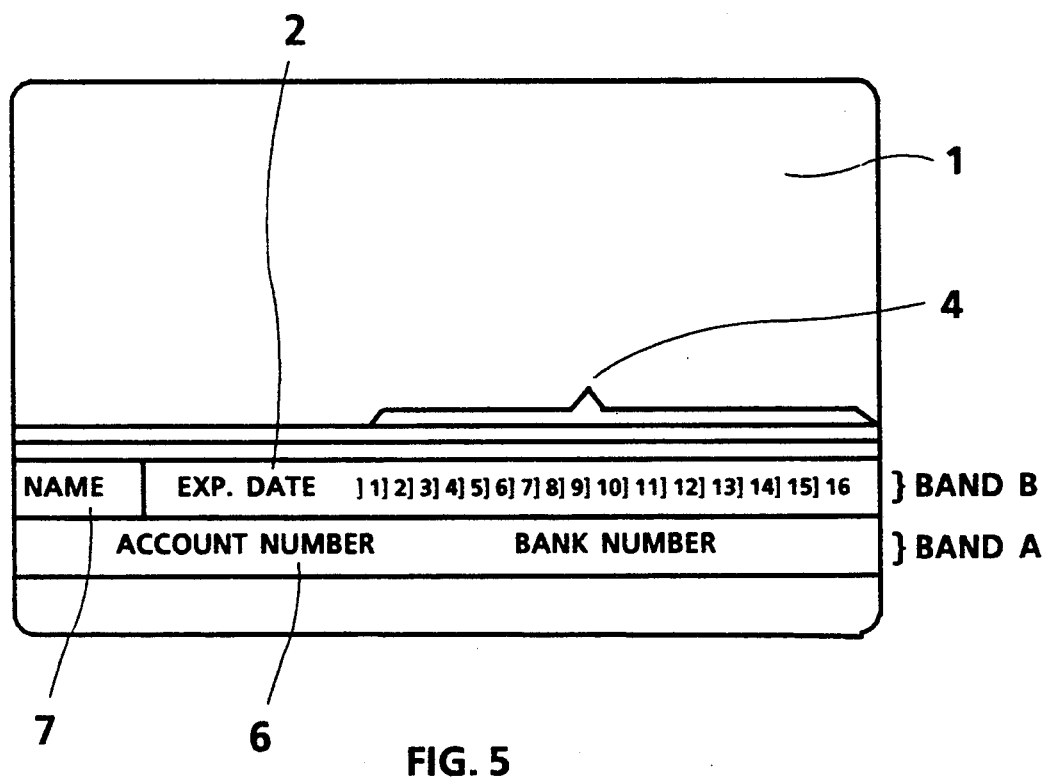
FIG. 5 is a view showing a regular credit card on which the band B spare area is used for recording 16 variable expiration dates of a half-month time period.

According to the present invention, it will be imprinted onto the credit cards magnetic surface magnetically in bar code or in some other code or just as simple magnetic markings the calendar for a full year, as shown in FIG. 2, the calendar for a certain part of the year, for example the calendar for 3 months 3, FIG. 3, or the calendar for only half of a month 4, as shown in FIGS. 4 and 5.

Thus the one day expiration time credit card can have written on it by means of 16 simple magnetic markings 8, FIG. 4 the calendar for only half of the month and the same 16 magnetic markings can be used for the second half of the month (from 17th to the 28th, 29th, 30th or 31st of the month).

Alternately the one day expiration time credit card can have written on it by means of simple magnetic markings the calendar for one week only: Monday, Tuesday, Wednesday, Thursday, Friday, Saturday and Sunday.

According to one embodiment of this invention, the 1 to 2 year duration of a typical credit card can be reduced to an adjustable one month duration of this credit card, as described briefly in the following:

The expiration date, according to this embodiment of the present invention, will be written magnetically onto the credit card as 12 different expiration dates: 1/94,2/94,3/94,4/94,5/94,6/94,7/94,8/94,9/94, 10/94, 11/94, and 12/94.

These expiration dates can be written onto the credit card in bar code as it is usually done, or these expiration dates can be written onto the credit card just as magnetic dot marks in certain locations of the cards magnetic surface.

During some of the last days of January 1994, the card owner inserts his credit card into a device, which magnetically erases the 1/94 expiration date. Now the card has as its expiration date the next expiration date: 2/94. Thus the card is now valid until the end of February 1994. The card owner uses this process only once a month, which can not be too much trouble for him or her. For this monthly change of the expiration date of the credit card, he or she can use a demagnetizing device, which his or her bank will lend to all card-owners. For this monthly change of expiration date he or she can also use for this purpose modified ATM machines. By means of his PIN number, the ATM machine positively identifies the card owner, before the expiration date on his credit card is changed. The monthly change of the expiration date can be done also in all larger stores in customer service departments after the card owner has identified himself or herself, for example by means of his or her drivers license.

In order to use The Third Millennium Credit cards according to this embodiment of the present invention with 12 monthly expiration dates, the credit card reading devices don't have to be changed. Only in the central processing area the electronic means for the credit card reading devices have to be modified slightly, to read only the first of the remaining magnetically imprinted expiration dates from the credit card and discard the following subsequent months expiration dates, which will be read during the following months instead.

In order to change the currently used major credit cards to The Third Millennium credit cards according to other embodiments of the current invention, the currently used cards have to be modified only slightly. The major credit cards have already an extra magnetic surface 5, FIG. 1, FIG. 2 and FIG. 3 provided for future information on these credit cards. This additional magnetic surface, usually about 45% of the second magnetic information band (band B) on the card, can be used for the variable date information, according to the present invention.

The current information on this second magnetic information band B: the card owners name 7, FIG. 1 and the credit cards expiration date 2, FIG. 1 can be shifted to the left, towards the leading edge of the credit card. The expiration date magnetic code marks 8, according to the current invention, can be marked on the right side, the lagging part of the magnetic band B, as shown in FIG. 5. The expiration date magnetic marks 8, FIG. 5 according to the present invention can also be written on the left side, the leading part of the magnetic band B, according to another embodiment of this invention.

Figures 6, 7:
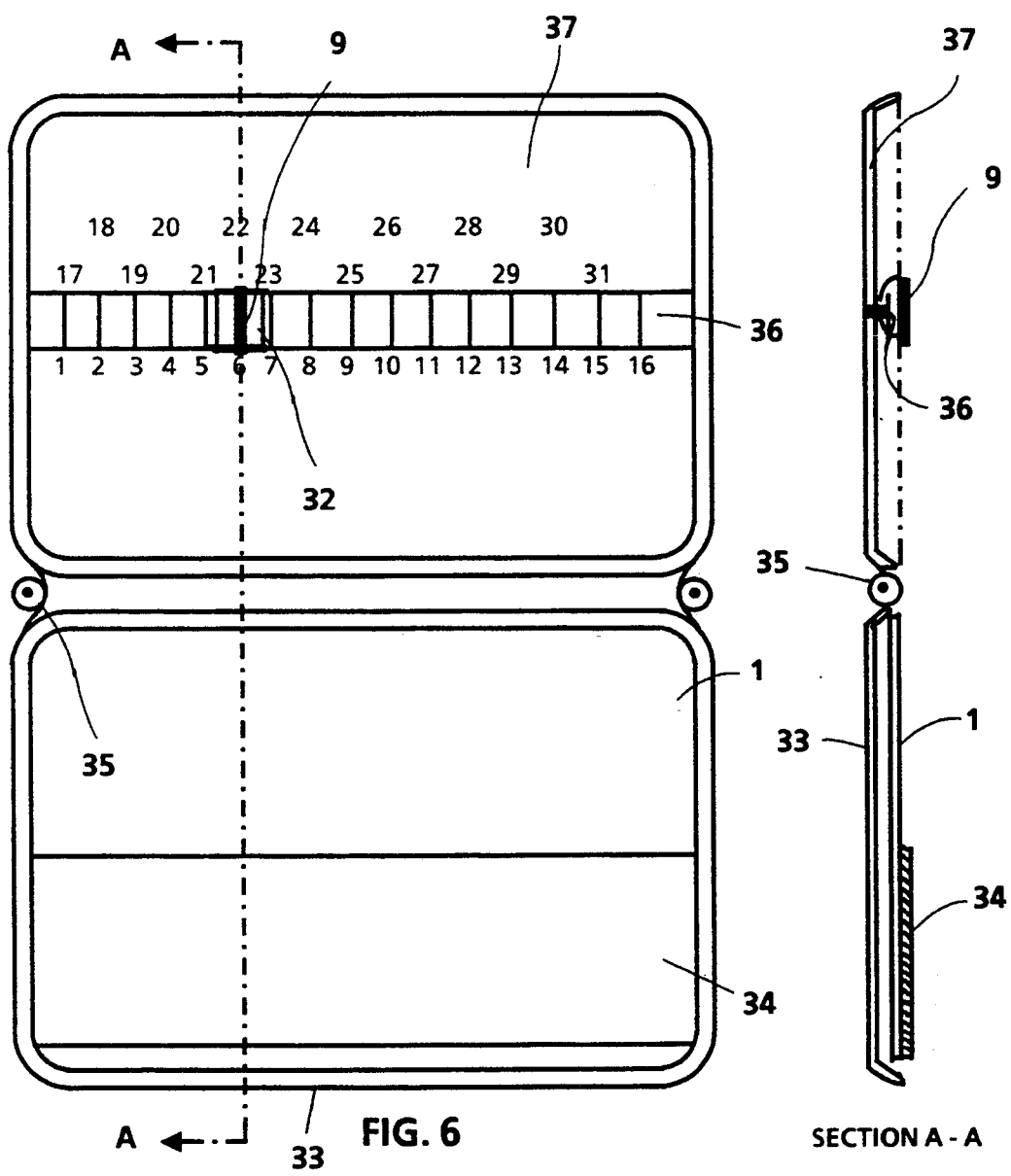
FIG. 6 is a view showing a credit card case for expiration time adjustments, where a tiny permanent magnet, sliding along a bar from left to right inside of the lid of this case, is used for selectively erasing expiration date/expiration time marks from a credit card.
FIG. 7 is a cross-sectional view of this credit card case, taken along the line A—A of FIG. 6.

The main principle of this invention is, that by means of a tiny, precisely cut movable permanent magnet 9, FIG. 6 and FIG. 7, day after day the current days date as the expiration date is erased from the magnetic surface of The Third Millennium credit card according to the present invention, thus making this day to a card validity day and leaving the next day as the new expiration date on the card, during which date the card cannot be used, because the card has expired.

In case a thief has in his possession this kind of variable expiration date credit card, he or she can use it only until midnight that day. In case he or she presents this card to a store next day, he or she will experience a big surprise, because this card has magnetically reached its expiration date, but the thief still believes, that he or she has a valid card, because on the card it is still printed the original, for him or for her now worthless, expiration date. But he or she has no way of knowing that, because the expiration date markings on the magnetic surface of the credit card are invisible.

In order to use these new type of credit cards, The Third Millennium credit cards according to this invention, the point-of-sales current card-readers don't need to be changed for one embodiment of this invention and have to be only slightly modified for another embodiments of this invention.

All point-of sales credit card readers, which are adjusted to read The Third Millennium credit cards, can still read as usual all the currently used credit cards.

In order to use The Third Millennium credit cards according to the present invention, the electronic checking circuits for credit cards in the central processing area have to be slightly modified.

Figure 8:
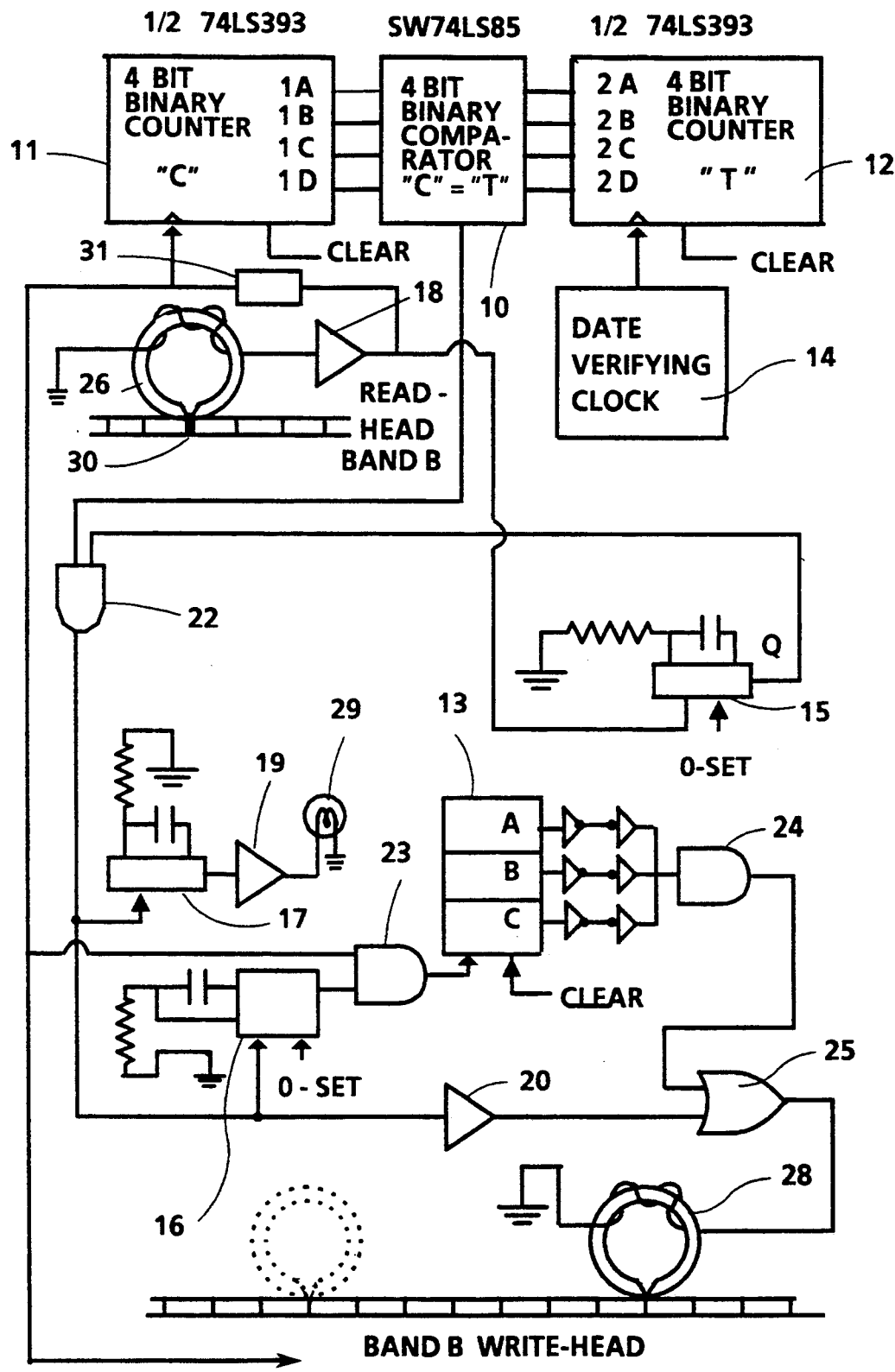
FIG. 8 is showing the electronic circuitry, which has to be added to the conventional credit card scanning circuitry in the central location, where the information from the point-of-sales scanners is processed.
Figure 9:
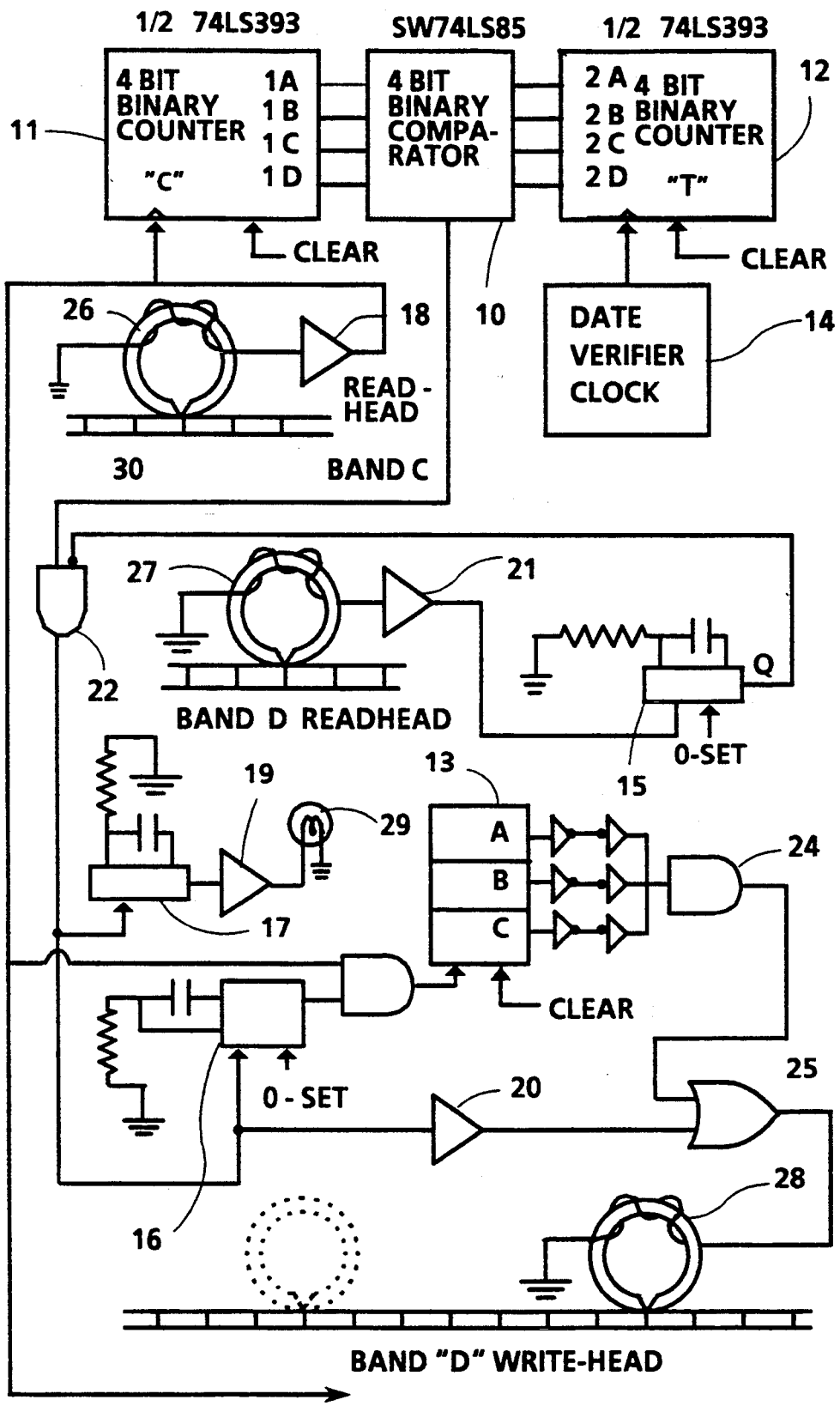
FIG. 9 is showing the electronic circuitry according to another embodiment of this invention. According to this embodiment of the invention, it has to be added a band C and a band D to the magnetic surface of the credit card. It also has to be added a read-head for band C and a read-head for band D for the point-of-sales scanner device. Also a write-head has to be added to the point-of-sales scanner, which will magnetically write date marks onto the band D of the credit card according to the present invention.

The necessary electronic circuits, shown in FIGS. 8 and 9, will be located in the respective central processing locations, where the merchants phone in the credit card information from their point-of sale credit card scanners.

The electronic circuits for the current invention, which will be located in the central processing location for credit cards, are shown in FIGS. 8 and 9.

The circuitry, shown in FIG. 8 will be used, when the variable expiration date information is written onto the currently unused, leading or lagging part of the magnetic band B.

In case the variable expiration date information is written on the magnetic band D and the necessary timing marks are written on the magnetic band C, a slightly different electronic circuitry will be used, which is shown in FIG. 9. The electronic components needed for this inventions electronic circuits according to FIG. 8 and FIG. 9 in central processing area, are as follows:

1) One 4 Bit Binary comparator, for ex. SW74LS85, 10, FIGS. 8 and 9.
2) Three 4 bit binary counters: 11,12 and 13, FIGS. 8 and 9, for example ½ of 74LS 393.
3) One Date Verifying Clock, 14. FIGS. 8 and 9.
4) Three one shot multivibrators 74LS121: 15, 16 and 17, FIGS. 8 and 9.
5) Four amplifiers, 18, 19, 20 and 21, FIGS. 8 and 9.
6) Three AND-gates 22, 23 and 24, FIGS. 8 and 9.
7) One OR-gate, 25, FIGS. 8 and 9.
8) One read-head 26, according to FIG. 8; two read-heads 26 and 27, according to FIG. 9.
9) One write-head 28, FIGS. 8 and 9.
10) One green light indicator lamp 29, FIGS. 8 and 9, and appropriate electronic circuitry (not shown) to send "Transaction Approved" messages to point-of-sales scanners.

When the magnetic mark 30, FIG. 8 for the starting pulse on band B passes under the read-head 26, FIG. 8, the clock oscillator 31 starts to oscillate with a certain frequency, which equals to the frequency, with which the expiration date magnetic marks 8 are subsequently passing by under this read-head 26, FIG. 8. The pulses from this clock oscillator are pulsating the binary counter 11, FIG. 8.

The four outputs from this binary counter 11 are inter-connected with the four outputs from the Date Verifier binary counter 12 by means of the comparator 10, FIG. 8. The output from this comparator is combined with the expiration date information from the band B's reading-head 26, via its inverting amplifier 18, one shot multivibrator 15 and an AND-gate 22, FIG. 8.

In case there is a positive voltage output from the comparator 10, FIG. 8 and simultaneously also a positive voltage output from the band B read-head's 26 inverting amplifier 18, FIG. 8 and a positive voltage from the one-shot multivibrator 15, FIG. 8, during a scan-through of the credit card, applied to the AND-gate 22, then the point-of-sales scanner gets from the central processing location back the message, that the expiration date is O.K., has not jet passed and the scanner displays a signal "Transaction Approved". In case the variable expiration date information, coded on the card indicates, that the card has expired, the scanner displays "Pick Up The Card" or some other wording, indicating that the scanned credit card has expired. In case the transaction has been approved, in the central processing area a green light is turned on by means of a multivibrator and an amplifier, indicating that a Third Millenium Credit card has been approved. Instead of the green light it could be used a counter in central processing area, to keep a daily count, showing how many of these new Third Millennium Credit cards have been used each day by the sales of point-of-sales scanners.

The consecutive expiration dates of the credit card are marked in sequence on certain positions on the credit cards as shown in FIGS. 3, 4 and 5. The positions of the dates written on the magnetic surface of the credit card according to the present invention can also be written in a scrambled sequence for increased security of this novel safety system for credit cards.

The erased date markings will be rewritten onto the credit card according to the present invention by means of automatic switching of the read-head 26, FIG. 8 of the band B to the writing mode or by means of mounting another write-head 28, FIG. 8 onto the band B of the scanner, for example four magnetic marking steps after the read-head 26, FIG. 8.

In case the read-head 26, FIG. 8 is electronically or electromechanically switched over to be a write-head, then it starts to write rejuvenating marks onto the band B immediately after the scanner has displayed the approval sign. In case an extra write-head is used for this purpose, the write-head 28, FIGS. 8 and 9 will write a rejuvenating mark onto the credit card a few date-marks before the read-head 26, and it will also write an additional date-mark about 7 date-marks later, after the first written rejuvenating mark.

As described above, instead of compressing the variable date information into the 45% spare space of the band B, two additional bands, band C and band D, 4, FIG. 4 and if necessary, several more magnetic bands can be used for the credit card according to the present invention, as shown in FIG. 4.

The use of additional bands

A) will enable to have wider tolerances for better positioning of the magnetic eraser-magnets 9, FIG. 6, for changing the expiration dates.

B) will enable to increase the calendar, which is written in magnetic markings onto the credit card, from ½ month to one full month or to several months, if deemed necessary by some banks or credit card companies.

The electronic circuit in the central processing area, shown in FIG. 9 is only slightly different from the circuit shown in FIG. 8, in case two additional magnetic bands, C and D are used.

In case these additional magnetic bands are used, the card scanners in point-of-sales locations have to be modified. Two new read-heads (for band C and for band D) have to be incorporated into the scanner. It has to be added also a write-head for writing magnetic marks onto the band D, for continuous rewriting the erased expiration date marks on that band.

The changeable expiration date credit cards can be programmed either manually or automatically.

In FIG. 6. it is shown the simplest, the easiest manual adjustment device for the credit card according to the present invention. In FIG. 7 it is shown a cross-section A—A of that device, taken across the demagnetizing magnet 9, FIG. 7.

The credit card owner of the credit card according to this invention is provided by his bank with an elegant business card case 33, FIG. 6. for expiration date adjustments. The card owner is sliding his or her credit card into this case 33, with magnetic area (34) side up and magnetic band lagging, magnetic band away from the hinge 35 of the case.

Then he or she moves the tiny magnet 9, FIG. 6, which is sliding along a crossbar 36, FIG. 6 into a position, where the tiny magnet is pointing exactly to the number of the current date of the month 32, FIG. 6, marked onto the lid 37 of the card case, below the sliding magnet 9, FIG. 6.

Then he or she closes the credit card case for one to two seconds, removes the updated credit card from the case and goes shopping. (He or she should leave the credit card case home or at least keep it separate from the credit card in another pocket).

Figure 10:
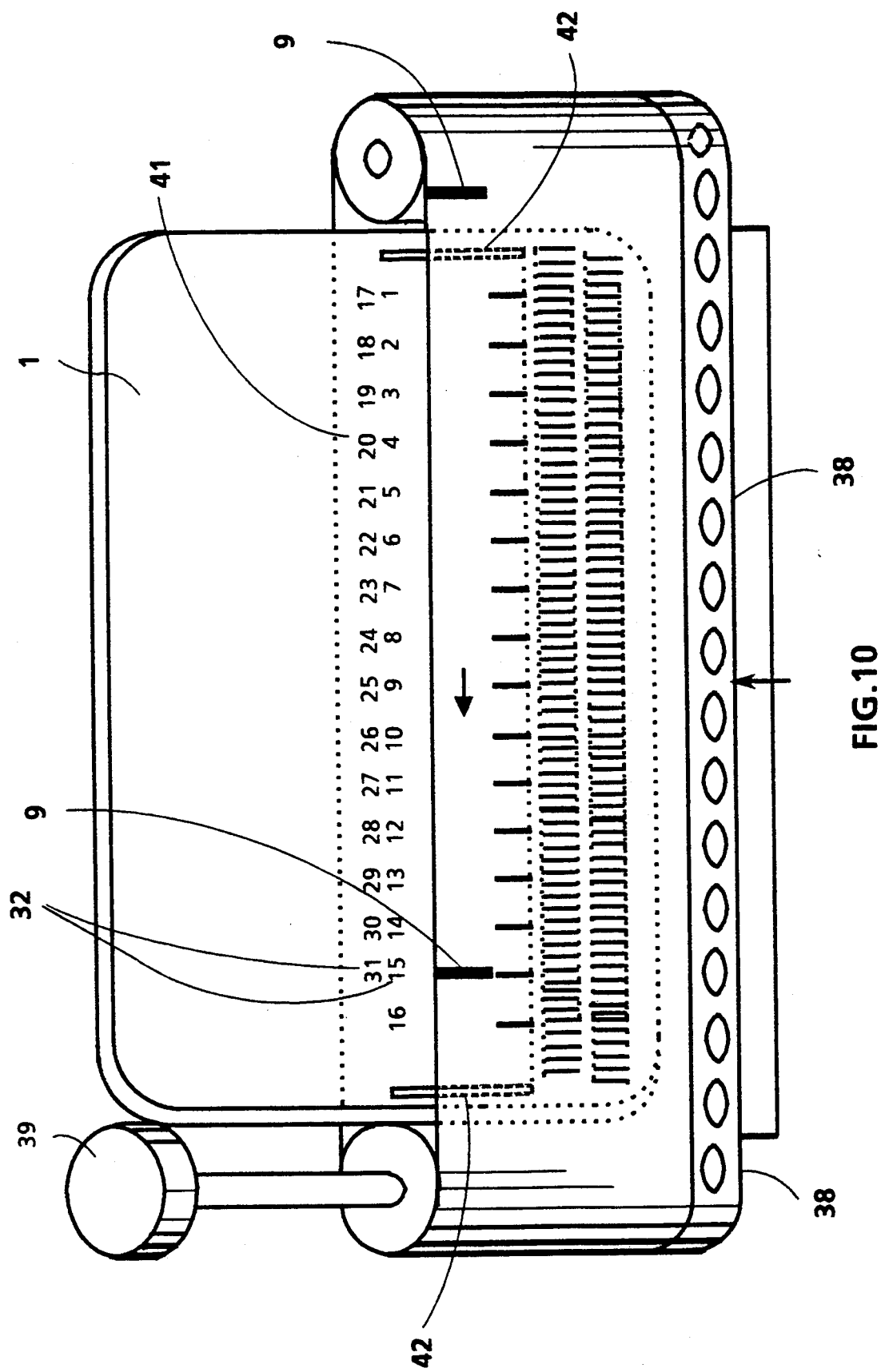
FIG. 10 is showing an expiration date changing device, which is operated by means of an endless band, carrying 3 tiny permanent magnets on it. The erasing magnet will be positioned into proper erasing position by means of turning a knob. The credit card will be inserted into a slot on top of this device, magnetic band of the credit card facing the endless band of this device.

In FIG. 10 it is shown another embodiment of the manual expiration date changing device.

In this device there are onto a continuous flexible band 38 attached three tiny magnets 9. This band is adjusted manually, by means of turning a knob 39 into a position in which one of the magnets points toward the current date-mark 32 on the case 41 of this device, as shown in FIG. 10. The credit card according to this invention will be placed on top of this device into for that purpose mounted pocket 42 for 1 to 2 seconds, for updating the expiration date information, before the credit card owner goes shopping for that day.

According to yet another embodiment of this invention the credit card customer is provided by his bank with an elegant credit card case 33, FIG. 11, and with 16 cards 43, with a tiny magnet 9 on each of them in various positions of the card as shown in FIGS. 11 and 12.

Every day the card owner places onto the lid 37 of the credit card case the appropriate date card (the card which is marked with the current date) on top of the deck. Then he or she places his or her credit card according to the present invention into this case, magnetic band area 34 facing him and opposite side of the lid of the case. Then he closes the case for 1 to 2 seconds. After the demagnetizing is thus done, he or she takes the updated credit card out and goes shopping.

Figure 13:
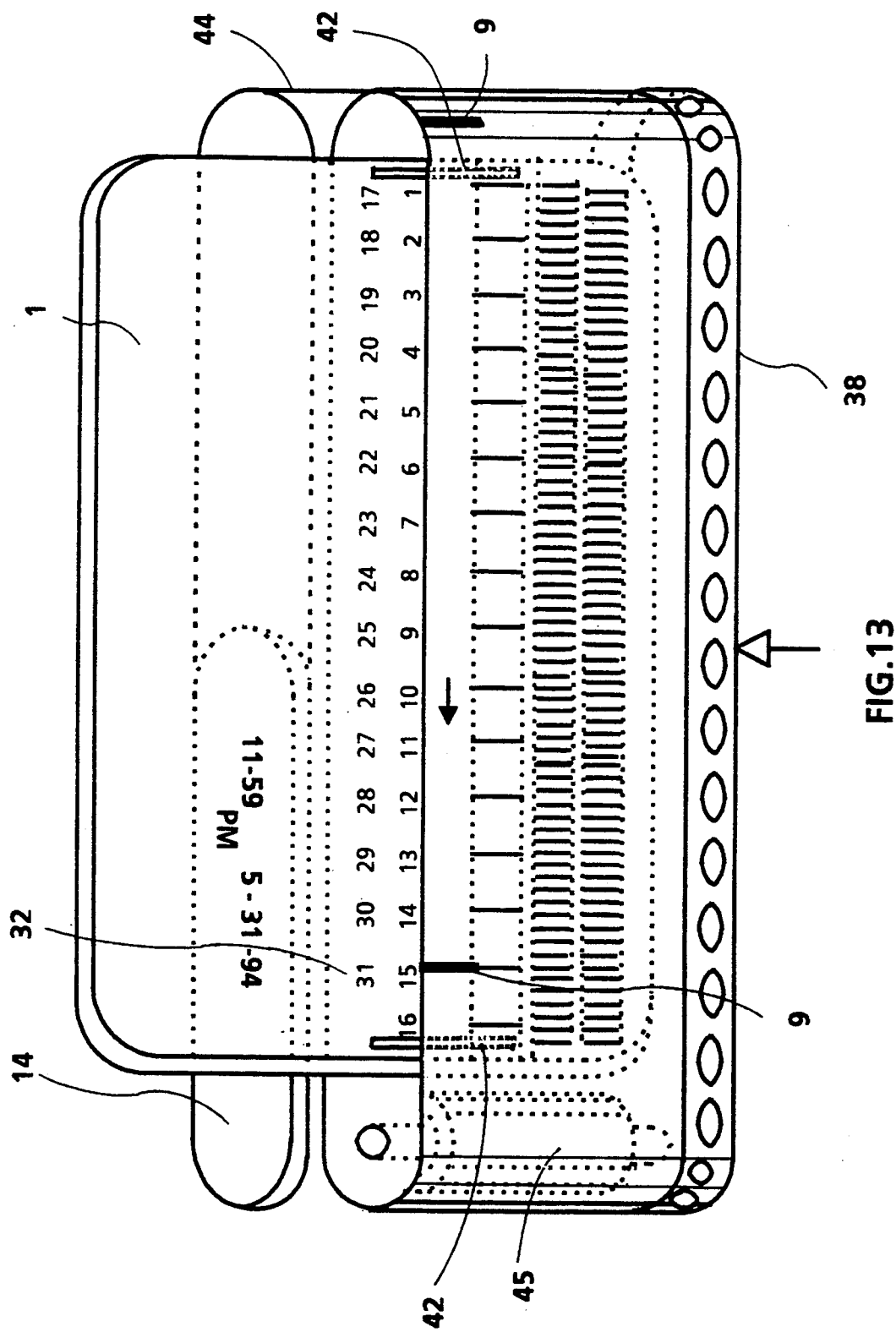
FIG. 13 is an automatic expiration date changing device, which has an endless band carrying three tiny permanent magnets around its perifery. The expiration date, actually the day before expiration date will be continuously adjusted on the credit card by means of a Date-Verifying-Clock and by means of a stepper motor or any other moving means for appropriate positioning of one of these magnets to erase from the credit card the magnetic marking of the current date.

The expiration date changing device can be also a fully automatic device, as shown in FIG. 13.

Here an endless, flexible band 38 is carrying three tiny magnets 9 around the case 44. This band 38 is by means of a stepper motor 45 moved to appropriate next days position by means of a signal from Date-Verifying-Timer-Clock 14, at every midnight at 11:59 PM. The credit card 1 according to the present invention will be inserted into a date updating pocket 42, attached to this device, for 1 to 2 seconds, for updating of the expiration date information, before the credit card owner goes shopping that day.

Figure 14:
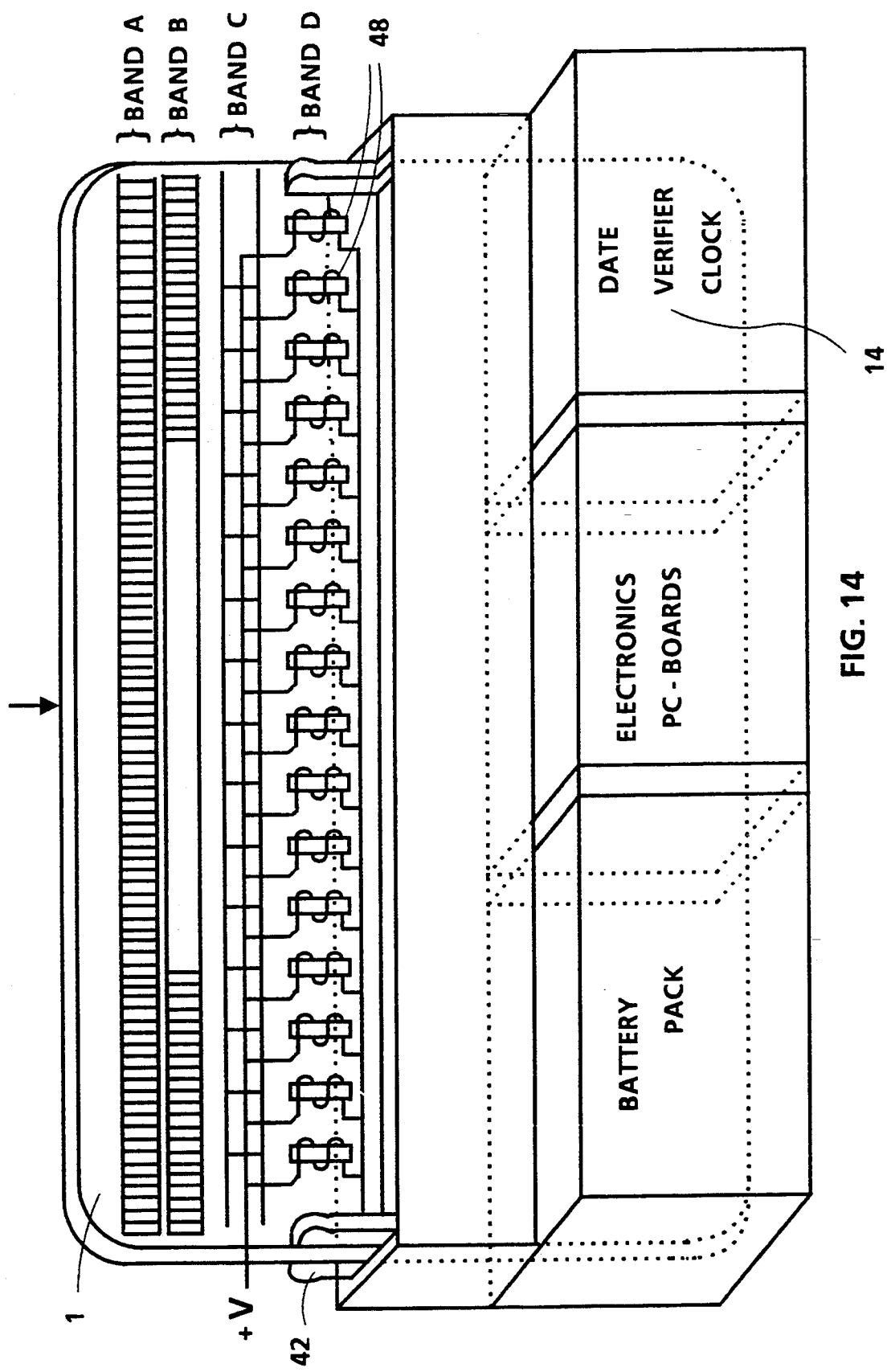
FIG. 14 is a view showing an automatic card validity date changing, device, which has a row of tiny electromagnets, of which one at a time selectively erases the present day's magnetic marking from the card, thus making the card ready for that day's shopping. The current date for operating of this device is automatically selected by the Date-Verifying Clock, which is built in into this device.

According to another embodiment of the current invention without moving parts, which looks like a tiny sandwich toaster and which is shown in FIG. 14, the erasing can be done by means of tiny electromagnets 48, FIG. 14 positioned so, that they are touching slightly the credit cards magnetic band D, when the credit card is dropped into a pocket 42 of this device.

Figure 15:
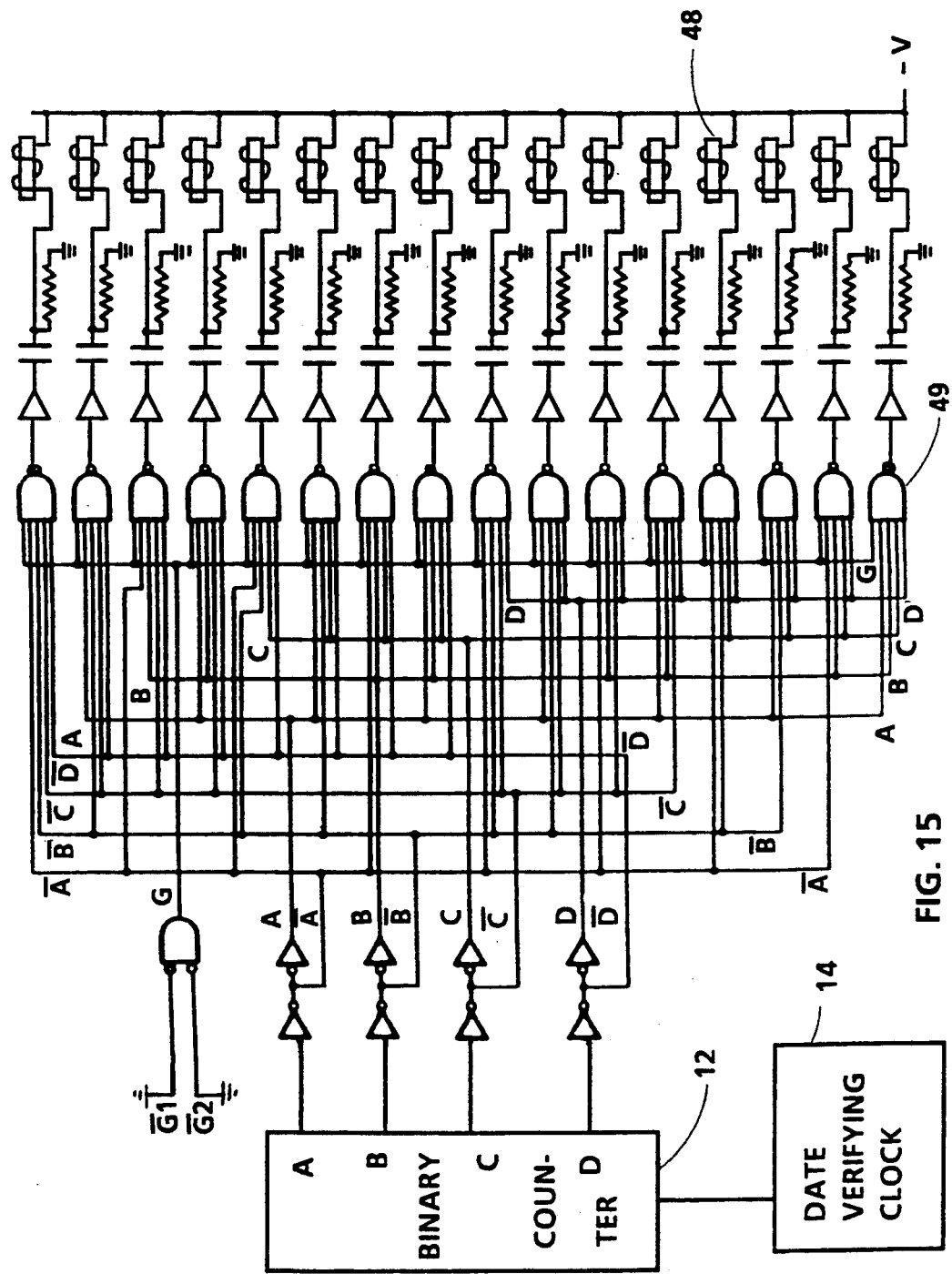
FIG. 15 is showing the electronic circuitry, which is used to control the expiration date changing device, shown in FIG. 14.

The electronic circuitry to activate these electromagnets 48 is shown in FIG. 15. The output voltage from a Date-Verifying Clocks 14, FIG. 15 binary counter 12, FIG. 15 is connected every day to a new AND-gate 49, FIG. 15. The output AND-gate 49 from the Date-Verifying-Clock's binary counter changes from day to the next day at midnight 11:59 pm and activates the appropriate days electromagnet 48 for erasing the next days magnetic marking from the credit card. Thus whenever the credit card owner takes the credit card according to the present invention from the pocket 42 of this device, it is updated just for that days shopping!

Figure 16:
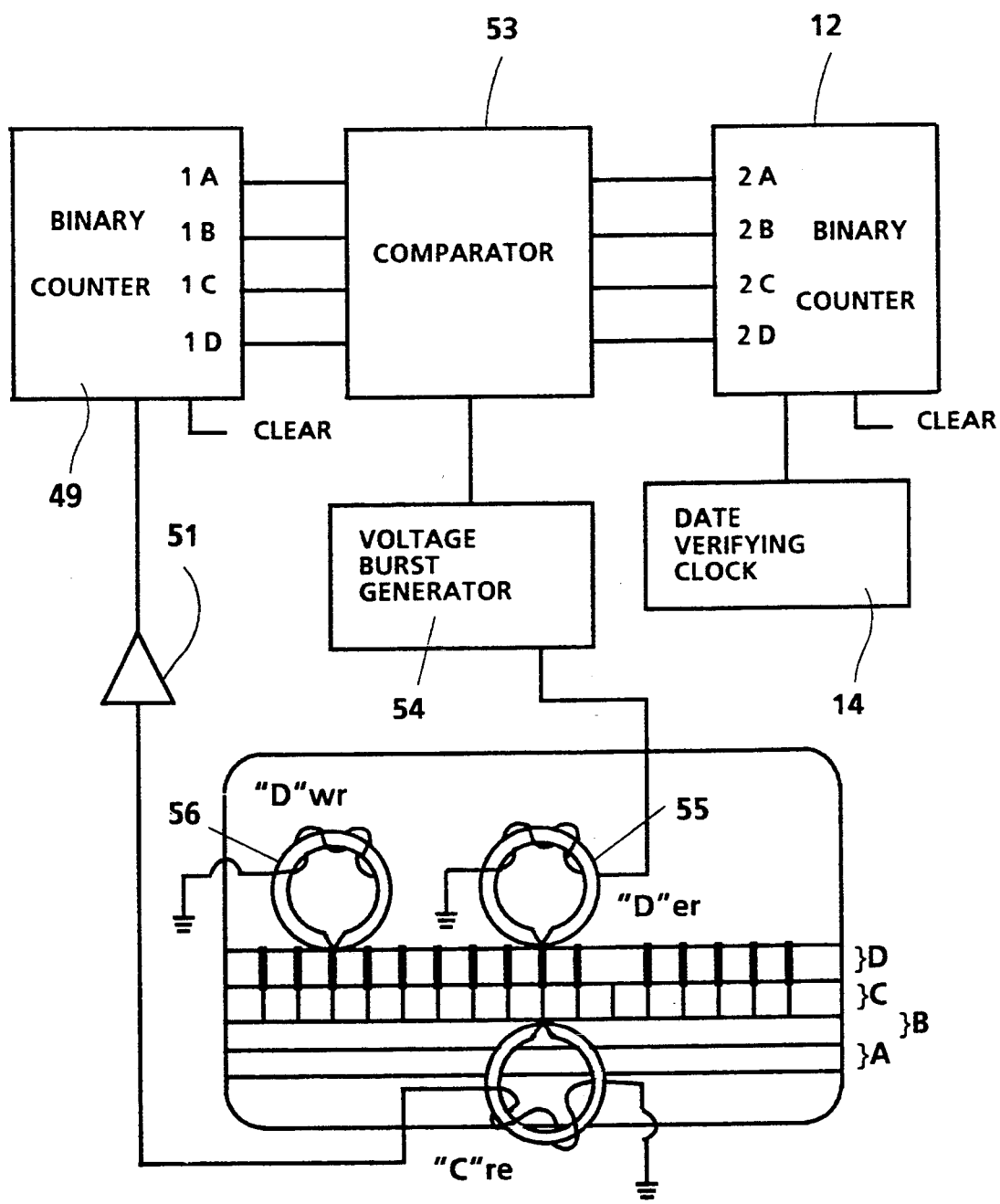
FIG. 16 is showing the electronic circuitry for the card validity date changing device, by means of a (tape-recorder-) erasor-head.

All necessary erasing of the variable expiration dates can be done by means of static demagnetizers, described above. Nevertheless dynamic demagnetizing is more powerful and a dynamic demagnetizing/rejuvenating device for the credit cards owners place, shown in FIG. 16, is described in the following. For this demagnetizing/rejuvenating device it is used a scanner, similar to the scanners, which are used in every point-of-sales checkout counter.

When the credit card according to the present invention is sliding through the scanner for updating the expiration date, the binary counter 49, FIG. 16 for the read-head 50 of channel C counts the pulses. The pulses are amplified with an amplifier 51. When the binary counter 49, FIG. 16 arrives to the pulse-count, which corresponds to the current date's pulse count from the binary counter 12 for the Date-Verifying-Clock 14, then a output signal is given by means of the comparator 53, FIG. 16. This output signal activates a 100 KHz decaying voltage burst generator 54 and to the present day's date corresponding magnetic marking is erased from the credit cards surface from band D, by means of the eraser-head "D"-er 55, FIG. 16.

The rejuvenation is performed in the same time by means of write-head "D"-wr 56, FIG. 16, while "D"-er 55, FIG. 16 is doing erasing. The write-head is mounted for ex. four magnetic marking-positions before the erasing-head "D"-er, 55, FIG. 16.

The writing head "D"-wr 56 is also writing a data-mark onto the band D, seven counter "C" counts later. A binary counter is starting (not shown in this schematic diagram), when the erasing head "D" er gets a signal for erasing and at count 7, sends a signal to writing-head "D"wr 56, to write down the second data mark onto the band D.

Because at every expiration date update, by means of the erasing head "D"-er, the write head "D"-wr marks down onto the band D two data-marks, it is always guaranteed that on the band D there are no data-marks (8, FIG. 4, FIG. 16) missing, except the erased mark of the card's validity date.

Occasionally there arises a need for rerecording the expiration date marks on the band D of the credit card according to the present invention. The magnetic marks could have been erroneously erased, when the erasing magnet was accidentally placed into wrong position, while it was depressed against the credit card.

A dynamic card rejuvenating device, shown in FIG. 17, consists of a scanner device with a reading head 57, mounted to read the band "C" timing marks, and of a writing head 58, arranged to write magnetic date-marks 8 onto the band "D" in the rejuvenation process at every band "C" timing mark as shown in FIG. 17. Band "C" timing-mark signals, picked up by the band "C" read-head 57, FIG. 17, will be amplified in amplifier 46 and pulse-formed in multivibrator 47, FIG. 17 and then rewritten by means of the band "D" write-head 58, FIG. 17 as magnetic date-marks 8 on the surface of band "D".

It is also possible to use inexpensive static rejuvenating devices if necessary.

A static rejuvenating device, shown in FIG. 18, works as follows:

For regenerating of magnetic marks on credit card it is used a narrow, elongated package of strong permanent magnets 59, FIG. 18, packed along a line as shown in FIG. 18, and packed in such a way, that each of these magnets is repelling the adjacent magnet. The credit card according to the present invention is placed for a second or two against this array of permanent magnets in order to regenerate magnetic date-marks on band D of the credit card. Any other similar arrangement with strong permanent magnets or with electromagnets to regenerate date marks on the credit card according to the invention, can be used. Using of any other kind of magnet arrangement doesn't change the main idea of the present invention.

FIG. 19 shows a sequence of magnetic marks 8 on the credit cards band D, which were generated by means of this array of permanent magnets 59, FIG. 18.

Figure 20:
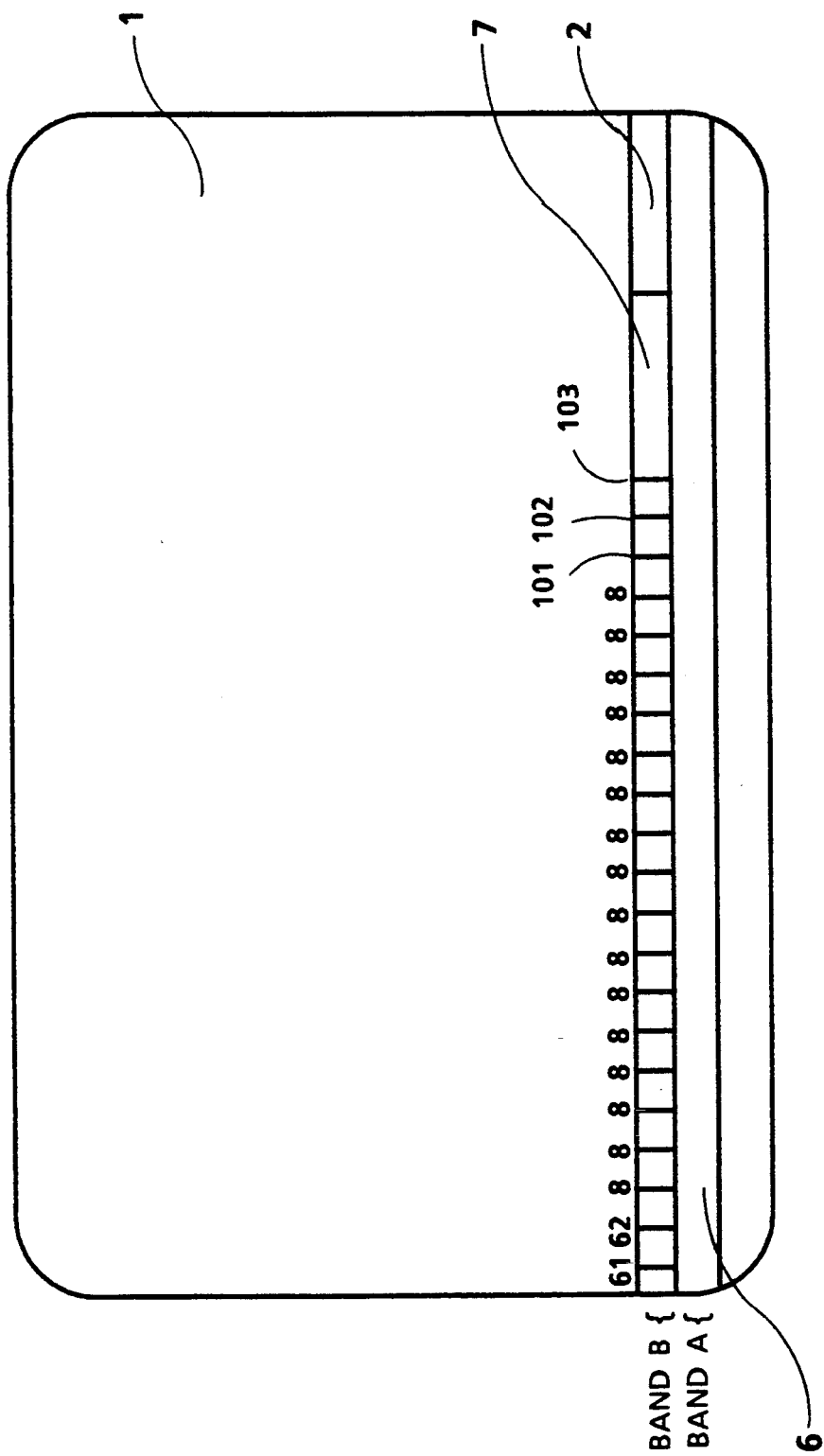
FIG. 20 is showing a credit card, where on the leading edge of the credit card, on the band B, are magnetically recorded 16 changeable expiration dates. On this FIG. 20 it is also shown two timing marks in the far left end of the band B, which are used for generating equal time pulses for reading the 16 magnetic expiration date-marks from the credit card. On the band B are also recorded 2 additional magnetic marks for specifying two selected shopping periods and one additional magnetic mark for cancelling these 2 shopping time periods, in case the actual shopping time exceeds the preselected shopping time of the card owner.

In FIGS. 20, 21 and 22 it is shown the preferred embodiment of the present invention. In FIG. 20 it is shown a credit card 1, FIG. 20, according to the preferred embodiment of this invention, which will be used together with the modified point of sales scanning circuitry, shown in FIGS. 21 and 22.

The current information on the second magnetic band B of a typical credit card: the card owners name 7, FIG. 20 and the credit cards expiration date 2, FIG. 20 will be shifted to the right, towards the lagging edge of the credit card. The expiration date magnetic code marks 8, FIG. 20, according to the current invention will be marked on the left side, onto the leading part of the magnetic band B, as shown in FIG. 20. On the far left end of the magnetic band B, there will be magnetically written two parallel timing marks 61 and 62, FIGS. 20 and 21, about ⅛" to 3/16" apart from each other.

When the credit card according to this embodiment of the invention is being scanned, the read-head 63, FIG. 21, reads first the first timing mark 61, FIG. 20. Signal from this timing mark will be amplified in an amplifier 64, FIG. 21. The output from this amplifier is connected to a binary counter 65, FIG. 21. When this binary counter receives the first signal from the amplifier 64, its output changes from AB, to AB. This output is connected to an AND-gate 66, FIG. 21. To this AND-gate 66 is also connected the output of a free-running oscillator 67, FIG. 21, with a frequency for example 10 kHz.

The output from this AND-gate 66, FIG. 21 is sending counting pulses to a binary counter 68, FIG. 21 and also to a binary counter 69, FIG. 21, which is connected to this binary counter 68, FIG. 21.

When the read-head 63, FIG. 21 reads the next timing mark 62, FIG. 20 on the credit card, the signal from this timing mark gets amplified in the amplifier 64, FIG. 21. Output from this amplifier, connected to counter 65, FIG. 21, steps this binary counter one step forward to reading AB. This AB output is connected to an AND-gate 70, FIG. 21. To this AND-gate is also connected output from the free running oscillator 67, FIG. 21. The output from this AND-gate 70, FIG. 21, is sending counting pulses to a binary counter 71, FIG. 21, and also to a binary counter 72, FIG. 21, which is connected to this binary counter 71, FIG. 21.

When coincidence occurs between the counter outputs from the binary counter 68, FIG. 21 and the counter outputs from the binary counter 71, FIG. 21, then the comparator 73, FIG. 21, sends a positive signal to the AND-gate 74. When coincidence occurs between 69, FIG. 21 and 72, FIG. 21, then the comparator 75 sends a positive signal to the AND-gate 74. After these both signals have arrived, then the AND-gate 74, FIG. 21 sends a signal out to a binary counter 11, FIG. 21, to a binary counter 76, FIG. 21, to two inverting amplifiers 78, FIG. 21 and 79, FIG. 21 and to a toggle Flip-Flop 92, FIG. 21. The outputs of the inverting amplifiers 78 and 79 are connected to Flip-Flops 80 and 81, FIG. 21. The outputs of toggle Flip-Flop 92, FIG. 21 are connected as inputs to AND-gates 93 and 94. The other input to these AND-gates is from the oscillator 67, FIG. 21. The outputs from these AND-gates are connected to an OR-gate 95, FIG. 21. The output from this OR-gate 95, FIG. 21, is connected to the binary counter 71/72, FIG. 21.

The counter 71/72 counts until there is again a coincidence between the outputs of counters 68/71 and 69/72 and at that moment an output pulse goes out through comparators 73/75 to the AND-gate 74. The output from this AND-gate triggers again the counter 11, the counter 76, the inverting amplifiers 78 and 79 and the Flip-Flop 92, FIG. 21.

The continuously running Date Verifying Clock 14, FIG. 21 is sending date-changing pulses at every midnight to the binary counter 12, FIG. 21.

When the binary counter's 11, FIG. 21 output equals to the output from the Date Verifier Clock's binary counter 12, FIG. 21 output, then the comparator 10, FIG. 21 sends a pulse out to an AND-gate 88, FIG. 21.

The read-head 63 is sending through the amplifier 64, FIG. 21 pulses to a toggle-Flip-Flop 89, FIG. 21. This toggle Flip-Flop 89, FIG. 21 is alternately triggering the Flip-Flops 80 and 81, FIG. 21. These two Flip-Flops are being reset by pulses from the inverting amplifiers 78 and 79, FIG. 21.

The outputs from these Flip-Flops 80 and 81 are connected to an OR-gate 90, FIG. 21. The output from this OR-gate is connected to the input of an inverting amplifier 91, FIG. 21. In case the output from this inverting amplifier is high and also the output from the comparator 10, FIG. 21, is high, then through the AND-gate 88, FIG. 21, it is sent a signal to point-of-sales scanner, that the card was magnetically validated and that the "Transaction is approved". Also in the same time a signal is sent via a Flip-Flop 96, FIG. 21 to a relay or electronic switch 97, FIG. 21, which switches the read-head 63, FIG. 21 from the reading mode to the writing mode. When the read/write head is in writing mode, it starts to rewrite onto the credit card the previously erased magnetic expiration-date-markings 8, FIG. 21 every time the triggering signals are arriving through the AND-gate 74, FIG. 21, by means of activating the one shot multivibrator 98, which generates the proper writing voltage for the reading/writing-head 63, FIG. 21.

The counter 76, FIG. 21 is arranged to count until to the last pulse, which is generated according to this invention, after which the reading head will be switched over to the conventional scanner electronics. Lets assume, that for the half months variable expiration dates it is used 16 pulse positions and for the variable shopping hours is used 3 pulse positions. Thus after the 19th pulse, at the 20 th pulse, the electronic system will be switched over from the electronic circuitry according to this invention to the conventional scanner electronics. The output from the binary counter 76 is connected to an AND-gate 110, FIG. 21, which at the 20 th pulse triggers a one shot multi-vibrator 97, FIG. 21. An amplifier 98, connected to this multivibrator, activates a relay 99, FIG. 21 or some other electronic switching means to connect the reading head 63, FIG. 21, to the conventional scanner electronics during the reminder of the credit card passing time through the scanner.

Credit card thiefs tend to work very fast. Sometimes expiration time at midnight will not be adequate to stop the use of stolen credit cards for quick purchases amounting to thousands of dollars.

In case The Third Millennium Credit card owners will be rewarded for a minor extra effort, the expiration time of The Third Millennium credit cards can be made as early as: 6 PM or 9 PM as shown in FIG. 22, in addition to the regular midnight expiration time.

For this purpose it will be added to the 16 regular date marks on the credit card 2 more additional, for hourly expiration allocated magnetic marks, mark #101, FIGS. 20 and 21 for a card owner planned shopping hours from 12:01 AM to 6:00 PM and mark#102, FIGS. 20 and 21 for a card owner planned shopping hours from 12:01 AM to 9:00 PM. The card owner will erase one of these marks, before he or she is going to do some shopping, depending on his or her planned shopping hours. During this specified time the credit card is valid and the card owner can do all his or her shopping. In case shopping time exceeds the time limit set by him or her, then he or she needs to erase only the magnetic mark #103 on The Third Millennium credit card, which sets the expiration time back electronically to the regular midnight expiration time.

This erasing is done simply by means of placing the credit card into the card holder, moving the tiny erasing magnet to the #103 magnetic mark position and closing the card case for 1 to 2 seconds.

When the magnetic mark in mark position #101, FIG. 21 has been erased by the card owner and somebody tries to use illegitimately this credit card during the Time-Verifying-Clocks time between 6 PM and midnight, as shown in FIG. 22, a "Transaction not approved" signal is sent to the point-of-sales scanning device.

Similarly, when the magnetic mark in mark position #102, FIG. 22 has been erased, and somebody tries to use this card during the Time-Verifying-Clocks time between 9:00 PM and midnight, as shown in FIG. 22, a "Transaction not approved" signal is sent to the point-of-sales scanning device.

Before going shopping, the credit card owner has to move the erasing magnet of his or her credit card case to the current day's date-mark, close the credit card case for a few seconds, thus validating the present day as a shopping day, then move the eraser either to mark #101 or to mark #102, in order to specify his or her planned shopping hours and close the credit card case again for a few seconds.

The surprising effect of these hourly expiring Third Millennium Credit cards will be, that because these cards expire very fast, they will hit immediately back the credit card thieves, who will pretty soon start to avoid using these cards. For example the thief can be stopped at any point-of-sales already at 7 PM, when the card was stolen as recently as 6 PM!

The thieves of purses and wallets and prospective users of lost credit cards start to throw away these dangerous THIRD MILLENNIUM CREDIT cards, without trying to use these at all for instant shopping!

The electronic circuitry for this hourly expiration time credit card is very simple and is described in the following:

The counter 76 output AND-gate 104 shown in FIG. 22 for the count #17, is connected to an input of AND-gate 105. This AND-gate is connected also to amplifier 91 for scanned and pulse formed pulses and to a relay 106 from the Time/Date-Verifying Clock. The contacts 107 and 108 of this relay are arranged to be closed, between 12:01 AM to 6:00 PM, as shown by 109, FIG. 22 and are arranged to be open between 6:00 PM and midnight as shown by 110, FIG. 22.

The amplifier 91 delivers a positive pulse, in case magnetic mark #101 has been erased prior to the scanning of the credit card, and at count #17 the binary counter 76, FIG. 22 delivers a positive pulse through the AND-gate 104 and in case shopping is done between 12.01 AM and 6:00 PM the Time/Date Verifying Clock's relays 106, FIG. 22 contacts 107 and 108 are closed and a positive voltage is delivered to the AND-gate 105.

When all three inputs are positive, then an output from the AND-gate 105 goes to an OR-gate 111. The output from this OR-gate 111 is also being combined with the daily expiration date circuitry output from the multivibrator MV 112 in an AND-gate 113. A one shot multivibrator MV 112 is being used to buffer for the time difference between pulses from the AND-gate 88 and OR-gate 111. In case the both pulses from the OR-gate 111 and from the multivibrator 112 are positive, a "Transaction approved" signal is sent to the point-of-sales scanner.

The counter 76 output AND-gate 114, FIG. 22 for the count #18, is connected to an input of the AND-gate 115. This AND-gate is connected also to the inverting amplifier 91 for scanned and pulse formed pulses and to a relay 116 from the Time/Date-Verifying Clock. The contacts 117 and 118 of the relay 116 are arranged to be closed between 12:01 AM to 9:00 PM, as shown by 119, FIG. 22, and are arranged to be open between 9:00 PM and midnight, as shown by 120, FIG. 22.

The amplifier 91 delivers a positive pulse to the AND-gate 115, in case the magnetic mark #102 has been erased prior to the scanning of the credit card and at count #18 the binary counter 76, FIG. 22 delivers also a positive pulse to the AND-gate 115 and in case shopping is done between 12:01 AM and 9:00 PM the Time/Date Verifying Clock's relays 116, FIG. 22 contacts 117 and 118 are closed and a positive voltage is delivered to the AND-gate 115.

When all these three inputs are positive, then a output from AND-gate 115 goes to an OR-gate 111. The output of this OR-gate 111, FIG. 22 is being combined with the daily expiration date circuitry output from the multivibrator MV 112 in the AND-gate 113. The one shot multivibrator MV 112 is being used to buffer for the time difference between pulses from the AND-gate 88, FIG. 22 and OR-gate 111, FIG. 22. In case the both pulses from the OR-gate 111 and from the multivibrator 112 are positive, a signal is sent to the point-of-sales scanner: "Transaction approved".

The amplifier 91 delivers a positive pulse, in case magnetic mark #103 has been erased prior to the scanning of the credit card. At count #19 the binary counters 76, FIG. 22 output AND-gate 133, FIG. 22 delivers a positive pulse. These both positive pulses are combined in an AND-gate 134, FIG. 22, which output is connected to the OR-gate 111, FIG. 22. When this or-gate output and the multivibrator 112 signal both are positive, then through the AND-gate 113 a signal is sent to point-of sales scanner, that "Transaction is approved".

At the count #16 of the binary counter 76, FIG. 22, the AND-gate 121 sends a pulse to Flip-Flop 96 through OR-gate 122, FIG. 22 and through an inverting amplifier 135, FIG. 22, to turn the Flip-Flop 96 off, thus stopping the writing of the write/read-head 63 and starting the reading instead, in case at the same time the contacts 123 and 124 of the relay 125 are closed, as shown by 126, FIG. 22, and in case in the same time the contacts 127 and 128 of the relay 129 are closed, as shown by 130, in FIG. 22. The Time/Date Verifying Clock relays 125 and 129, FIG. 22 contacts are open as shown by 131 and 132, FIG. 22 during the time from 5:30 PM to 6:00 PM and during the time from 8:30 PM to 9:00 PM. During that time the read-head 63, activated by means of pulses from AND-gate 74 and multivibrator 98 will continue to write rejuvenating magnetic marks onto 101,102 and 103 positions of the Third Millennium credit card during the counts 17, 18 and 19, and will be turned off finally at count 20, when the read/write head 63, FIG. 21 will start to read conventional scanner bar-code information from the band B of the credit card.

In this way the Third Millennium credit card owner, who does some purchases during the time intervals from 5:30 PM to 6:00 PM or from 8:30 PM to 9:00 PM gets his or her credit cards "shopping hours" section rejuvenated and he or she can specify next day different shopping hours than he or she had specified for the previous day.

In case he or she doesn't do any shopping at that time and wants to do the rejuvenating of the credit card at home instead, he or she can use the card rejuvenating devices shown in FIGS. 17, 18 and 19.

In case a thief steals a credit card and begins to use the stolen Third Millennium credit card between 5:30 PM and 6:00 PM or between 8:30 PM and 9:00 PM, he or she just got lucky and can continue until midnight of that day, when the credit card is stopped because of the change of the date.

But he or she has only 15.4% chances to be so lucky and about 85.6% of time he or she will get caught, while he or she is using this unexpectedly fast expiring Third Millennium credit card In case the legitimate owner of the credit card wants to use his or her credit card also after 9:00 PM, he or she needs only to demagnetize the magnetic marking on the line 103 on his or her credit card, by means of demagnetizing means in his or her credit card case and thus to be able to continue his or her shopping for that day. Erasing the magnetic marking on the line 103 of the credit card, will cancel the time limiting effect of specified certain shopping hours and the only time limit which will stay, is the midnight change of the date.

In FIG. 23 it is shown a credit card 1, FIG. 23, which will be used together with another, very practical embodiment of the present invention. The electronic circuitry for this embodiment of the current invention is shown in FIG. 24.

In order to use a typical major credit card, modified to be used according to the present invention, the current information on the second magnetic band, band B, of a typical credit card: the card owners name 7, FIG. 23. and the credit cards expiration date 2, FIG. 23 will be shifted to the right, towards the lagging part of the credit card. The expiration date magnetic code marks 8, FIG. 20, according to this embodiment of the present invention, will be written onto the left side, the leading part of the magnetic band B, as shown in FIG. 23. The expiration date code marks will start with the highest date number code marks, reading from left to right.

When the credit card according to this embodiment of the invention is being scanned, the read-head 53, FIG. 24, reads first the first magnetically written date-mark 8, FIG. 24, the magnetic date-marking for the 16th day of the month.

The signal from this date-mark will be amplified in an amplifier 136, FIG. 24. The output from this amplifier is connected to a binary counter 11, FIG. 24. This binary counter counts all the magnetic date-marks 8, FIG. 24 which are written on this credit card.

In case after all the magnetic marks are counted, the pulse count in counter 11 equals with the date count in counter 12, which is controlled by the Date-Verifying-Clock 14, then an output signal is sent from the comparator 10 to a detector circuitry, consisting of a diode 138, of a resistor 139, of a capacitor 140 and of another resistor 141. Simultaneously it is sent to the display of the point-of-sales scanner a message, that this "Transaction is Approved".

When the detected signal level exceeds the op-amplifier's 142 triggering level, the output signal activates an one shot multivibrator 143, which operates a relay 144. The contacts 145 and 146 of this relay are normally closed during the time when the counting of date-marks is going on, and are open, when date-mark counting has ended with the last date-mark marked onto the credit card. The contacts 146 and 147 of this relay will be closed when the relay is activated by means of the one-shot multivibrator 143, and the read-head 5', FIG. 24, will be connected then to the conventional scanning circuitry for the band B of the credit card.

The re-writing of erased expiration date marks onto the credit card's band B, can be done in ways, which were described earlier in connection with other embodiments of this invention.

What is claimed is:

1. A credit card with changeable expiration dates and hours, which can be changed every day by means of selective erasing of certain magnetic markings from multiple expiration date markings on this card and by means of selective erasing of magnetic markings for selected shopping hours on this card, with a permanent magnet, with an erasing head of a tape recorder or with an electromagnet; and onto which credit card, while it is swiped through a point-of-sales scanner, are rewritten, or are rewritten by some other means, magnetic markings for these expiration dates, which were previously selectively erased.

2. A credit card with changeable expiration dates and hours, according to the claim 1, wherein a tiny permanent magnet or a piece of a flexible permanent magnet material of the kind, which is used to attach notes to a refrigerator in the family kitchen, is used for changing the day of validity or the expiration date of the credit card, and for specifying certain selected shopping hours.

3. A credit card with daily changeable expiration date and expiration hour, according to the claim 1, which has recorded onto its magnetic surface days of certain part of a year, days of a month, days of half of a month, days of a week or hours of a day, from which it will be selectively erased one date-mark every day, before the card's owner uses his or her credit card for shopping.

4. A credit card with daily changeable expiration dates, according to the claim 1, which has on its magnetic area's third band, band C, permanently recorded a certain number of timing marks, and which has on its magnetic areas fourth band, band D, magnetically written, certain number of dates for each month or for part of the month, from which it will be selectively erased one date-mark each day, day after day, for defining the card's validity day.

5. A credit card with daily changeable expiration date, according to the claim 1, which has on its second magnetic band, band B on the spare area of this band magnetically recorded magnetic marks for 16 days of a month, or 7 days of a week and selected shopping hours of the day, which will be selectively erased from the card before the card is used for shopping, for defining the card's validity day and card's validity hours.

6. A specially equipped credit card case or card holder for the credit card with changeable expiration dates and hours, according to claim 1, in which there are built-in means for changing the expiration date/time, to update the card's validity dates and selected shopping periods on the credit card, while the card is inserted briefly for 1–2 seconds into that credit card case or card holder 7. A specially equipped credit card case, to be used for changeable expiration date credit cards, according to the claim 6, for the expiration date/time changing of the credit card, in which means for erasure of an expiration date/time mark on the credit card, comprises a permanent magnet, mounted on a slide, movable along a bar inside of the lid of the card case into a position, where it is erasing the onto the credit card magnetically recorded current date every time when this credit card case, with the credit card in it, is closed for a few seconds, making the current day to the credit card's validity day and making the next day's date to the new expiration date, during which the card is expiring.

8. A credit card case, to be used for the changeable expiration date credit card, according to the claim 6, in which the credit card's validity day is changed by means of inserting one of several magnetically active cards into this credit card case and then closing this credit card case, with the credit card in it, for a few seconds, each of these magnetically active cards having a tiny magnet mounted on it in a different position, corresponding to the 31 days of the month or 7 days of the week.

9. A credit card holder, to be used for the changeable expiration date credit card, according to the claim 6, in which the card validity day and the expiration date of the credit card according to this invention is changed, by means of positioning briefly for 1 or 2 seconds a tiny magnet, mounted on a manually turnable endless band, to the position of a magnetic date-mark of the current date on the credit card, which has to be erased.

10. A card holder, to be used for the changeable expiration date credit card according to the claim 6, which changes automatically the validity date of the credit card according to this invention every day, by positioning automatically, by means of a stepper motor or some other electromechanical device, controlled by a Date-Verifying-Clock, a tiny magnet, mounted on an endless band, to the position of a magnetic current date-mark on the credit card, which has to be erased at that day, in order to make that day to the card validity day.

11. A card holder, to be used for the changeable expiration date credit card according to the claim 6, which is arranged to change the expiration date automatically, by means of a Date-Verifying-Clock, by means of a binary counter and by means of one of the electromagnets of this device, for selective erasing of the current date's magnetic marking from the credit card, making thus the current date to the card's validity day.

12. Electronic circuitry for point-of sale scanners for checking out credit cards according to claim 1 with changeable expiration dates, consisting of a read-head for reading the band B magnetic markings, an inverting amplifier, giving an output-pulse, when there is no magnetic mark on a date-mark position on the band B, an oscillator, oscillation rate of which is adjusted to correspond to the rate, with which the date-marks are passing under the band B reading head, of a binary counter, counting said oscillator pulses, of a Date-Verifying-Clock, of its binary counter which has stored in the current date's information and of a comparator.

13. Electronic circuitry for point-of sale scanners for checking out credit cards with changeable expiration dates, according to claim 1, consisting of a read-head for reading the band B magnetic markings, an amplifier, transmitting the signals from the read-head to a binary counter, where the output count of the binary counter is compared to the output count from the Date-Veryfying Clock's binary counter in a comparator, and if found equal, the comparator generating an output signal which is used as an input to a detector circuitry, which via an op-amplifier and a via a relay, connects the read-head to the conventional band-B circuitry, for performing the regular credit card scanning operation, and which comparator output signal is also used for generating a "Transaction approved" signal for the point-of-sales scanner display.

14. Electronic circuitry for point-of sale scanners for checking out credit cards according to claim 1 with changeable expiration dates, consisting of a read-head for reading the band C pulses, an amplifier connecting this read-head to a binary counter, numerical output of which is compared to Date-Verifying-Clock's binary counter's numerical output in a comparator, which gives a "Transaction approved" signal in case the comparator output is coincident with a zero reading from the band D read-head, which will be the case, if the magnetic marking for that day had been erased from the credit card.

15. Electronic circuitry for point-of sale scanners for checking out credit cards with changeable electronics according to claim 1, consisting of a write-head which writes onto the band D magnetic markings certain number of magnetic marking positions before the read-head C position in relation to magnetic markings and certain number of band C counting pulses in time after this first magnetically written magnetic marking, where a certain number counting pulses delay is generated in a 3-bit binary counter or in some similar device.

16. The variable swipe-through speed compensation electronic arrangement, for credit cards with daily changeable expiration dates, according to claim 1, consisting of two magnetically written timing marks on band B of the credit card, and consisting of a band B read-head which sends pulses from these magnetic timing marks to a 2 bit-binary counter:
- a) which at the first count generated by the first magnetic timing mark sends a pulse to an AND-gate, which also receives pulses from a fast oscillator, and this AND-gate output lead sends counting pulses to a reference 8-bit binary counter, until the second pulse arrives from the above mentioned 2-bit binary counter; at what point of time the 8-bit binary reference counter stops pulse counting
- b) which at the second count, generated by the 2nd magnetic timing mark, sends a pulse to another AND-gate which also receives pulses from the above mentioned oscillator, and which AND-gate then sends pulses to the second 8 bit binary counter, which counts these pulses until the binary value of this counter is exactly the same as the binary value of the reference 8-bit binary counter, at which time an output pulse is generated by a comparator comparing the values of both of these counters, for generating a new timing pulse, and where additional equivalent time-length timing pulses are generated by sending the comparator output signal via a Flip-Flop to the second 8-bit binary counter for generating the necessary number of timing pulses, with equal time duration, first for reading and then for writing the band B expiration-date marks, one after another.

17. Electronic circuitry for point-of sale scanners for checking out credit cards with changeable date/hour electronics according to claim 1, where by means of erasing certain magnetic markings on the credit card, it is specified certain time periods, during which it will be connected into expiration date/hours checking circuitry several by the Time/Date Verifying Clock controlled relays.

18. Electronic circuitry for point-of-sale scanners for checking out credit cards with changeable date/hour electronics according to claim 1, where by means of erasing one specific magnetic marking on the credit card, the time limiting effect of certain specified shopping hours is cancelled and the only time limit which stays is the 12 midnight change of the date, when the card's validity for the current day ends, in case the card is not reactivated for the next day, by means of erasing the next day's magnetic mark from the card.

19. Electronic circuitry for point-of sale scanners for checking out credit cards with changeable date/hour electronics according to claim 1, where the erased specific magnetic markings for selected shopping periods will be rewritten onto the credit card during the last ½ hour of specified shopping periods, or during some other selected time period.

20. A credit card with monthly changeable expiration date, which has recorded into its magnetic surface 12 months of the year as its expiring months, magnetic markings for which will be erased selectively from the card, month by month.

* * * * *